United States Patent
Mostafa

(10) Patent No.: US 8,031,794 B2
(45) Date of Patent: Oct. 4, 2011

(54) SYSTEMS AND METHODS FOR INTERFERENCE CANCELLATION IN A MULTIPLE ANTENNA RADIO RECEIVER SYSTEM

(75) Inventor: Ayman Mostafa, Alpharetta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 1304 days.

(21) Appl. No.: 11/561,134

(22) Filed: Nov. 17, 2006

(65) Prior Publication Data

US 2007/0263744 A1 Nov. 15, 2007

Related U.S. Application Data

(60) Provisional application No. 60/746,843, filed on May 9, 2006.

(51) Int. Cl.
*H04B 7/02* (2006.01)

(52) U.S. Cl. ........................................ 375/267

(58) Field of Classification Search .............. 375/267, 375/347, 227; 370/290, 334
See application file for complete search history.

(56) References Cited

U.S. PATENT DOCUMENTS

| | | | |
|---|---|---|---|
| 4,528,674 A | 7/1985 | Sweeney et al. | |
| 5,818,208 A * | 10/1998 | Othman et al. | 323/207 |
| 5,937,015 A | 8/1999 | Dent et al. | |
| 6,137,843 A | 10/2000 | Chennakeshu et al. | |
| 6,226,321 B1 * | 5/2001 | Michels et al. | 375/227 |
| 6,226,507 B1 | 5/2001 | Ramesh et al. | |
| 6,304,618 B1 | 10/2001 | Hafeez et al. | |
| 6,369,758 B1 | 4/2002 | Zhang | |
| 6,470,047 B1 * | 10/2002 | Kleinerman et al. | 375/232 |
| 6,580,701 B1 * | 6/2003 | Ylitalo et al. | 370/334 |
| 6,678,520 B1 | 1/2004 | Wang | |
| 6,807,240 B2 | 10/2004 | Alamouti et al. | |
| 7,450,924 B1 | 11/2008 | Mostafa et al. | |
| 7,496,164 B1 | 2/2009 | Mostafa | |
| 2002/0018517 A1 | 2/2002 | Hara | |
| 2002/0126778 A1 * | 9/2002 | Ojard et al. | 375/346 |
| 2002/0141437 A1 | 10/2002 | Meyer et al. | |
| 2003/0063596 A1 | 4/2003 | Arslan et al. | |
| 2003/0112370 A1 | 6/2003 | Long et al. | |
| 2003/0185181 A1 | 10/2003 | Balachandran et al. | |
| 2003/0185292 A1 | 10/2003 | Fernandez-Corbaton et al. | |
| 2004/0109670 A1 | 6/2004 | Kim et al. | |
| 2004/0192215 A1 | 9/2004 | Onggosanusi et al. | |

(Continued)

OTHER PUBLICATIONS

Buehrer, R. Michael, et al., "Intelligent Antennas for Wireless Communications—Uplink," Bell Labs Technical Journal, Jul.-Sep. 1999, pp. 73-103.

(Continued)

*Primary Examiner* — Chieh M Fan
*Assistant Examiner* — Jaison Joseph
(74) *Attorney, Agent, or Firm* — Zagorin O'Brien Graham LLP

(57) ABSTRACT

Interference cancellation is implemented for a multiple antenna system. The multiple antenna receiver is provided that includes a whitening filter coupled to receive processed signals corresponding to signals received at respective antennas, and to generate whitened signals corresponding to each of the received signals, having a colored noise component whitened. The whitening filter coupled to determine the whitened signals, at least in part, utilizes symbols corresponding to the signals received by the plurality of antennas. A signal separator is coupled to supply the whitening filter with processed received signals having interference components reduced as compared to received signals.

13 Claims, 10 Drawing Sheets

U.S. PATENT DOCUMENTS

| | | | | |
|---|---|---|---|---|
| 2004/0258095 A1* | 12/2004 | Olivier | ............................ | 370/497 |
| 2004/0264417 A1* | 12/2004 | Heikkila et al. | .............. | 370/335 |
| 2005/0031061 A1* | 2/2005 | Ojard et al. | .................... | 375/346 |
| 2005/0036575 A1 | 2/2005 | Kuchi et al. | | |
| 2005/0042997 A1* | 2/2005 | Steele et al. | .................. | 455/295 |
| 2005/0071397 A1 | 3/2005 | Perets et al. | | |
| 2005/0079826 A1* | 4/2005 | He | ............................ | 455/67.13 |
| 2005/0226344 A1* | 10/2005 | Kuchi et al. | .................... | 375/267 |
| 2006/0056549 A1* | 3/2006 | Arslan et al. | .................... | 375/346 |
| 2006/0072485 A1* | 4/2006 | Cairns et al. | .................... | 370/290 |
| 2007/0002983 A1* | 1/2007 | Steele et al. | .................. | 375/347 |
| 2007/0211813 A1* | 9/2007 | Talwar et al. | .................. | 375/267 |
| 2009/0058728 A1 | 3/2009 | Mostafa et al. | | |
| 2009/0154620 A1 | 6/2009 | Mostafa | | |

OTHER PUBLICATIONS

Lee, William C. Y., Mobile Communications Design Fundamentals, second edition, chapter 6, 1993, title page and pp. 199-225.

Mostafa, Ayman, et al., "Single Antenna Interference Cancellation (SAIC) for GSM Networks," IEEE Vehicular Technology Conference, Oct. 2003, pp. 1089-1093.

Proakis, John G., Digital Communications, second edition, chapter 7, McGraw-Hill, 1989, title page and pp. 702-799.

SAIC and Synchronized Networks for Increased GSM Capacity, prepared by 3G Americas' SAIC working group, Mark Austin, editor, Sep. 2003, pp. 1-26.

Trigui, Hafedh and Dirk T. M. Slock, "Cochannel Interference Cancellation Within the Current GSM Standard," Proceedings of the IEEE 1998 International Conference on Universal Personal Communications, Oct. 5-9, 1998, Florence, Italy, pp. 511-515.

U.S. Appl. No. 10/837,933, filed May 3, 2004 (May 2, 2003 priority date), entitled "Systems and Methods for Interference Cancellation in a Radio Receiver System," naming inventor Ayman A. Mostafa.

Vainio, Olli et al., "Multistage Adaptive Filters for In-Phase Processing of Line-Frequency Signals," IEEE Instrumentation and Measurement Technology Conference, Ottawa, Canada, May 19-21, 1997, 6 pages.

Bingham, Ella and Hyvarinen, Aapo, A fast-Fixed-Point Algorithm for Independent Component Analysis of Complex Valued Signals, International Journal of Neural Systems, vol. 10, No. 1, World Scientific Publishing Company, Feb. 2000, 8 pages.

Craig, Stephen and Axnas, Johan, "A System Performance Evaluation of 2-Branch Interference Rejection Combining," in Proceedings of IEEE Vehicular Technology Conference, Fall 2002, IEEE 56th, vol. 3, pp. 1887-1891.

Haykin, Simon, "Adaptive Filter Theory," Third Edition, Prentice Hall, 1996, Section 6.4, pp. 262-271, 12 pages.

Hyvarinen, Aapo and Oja, Erkki, "Independent Component Analysis: A Tutorial," Helsinki University of Technology, Laboratory of Computer and Information Science, Apr. 1999, 30 pages, retrieved from URL: http://www.cis.hut.fi/aapo/papers/IJCNN99_tutorialweb/.

Mostafa, Ayman, A., "Single Antenna Interference Cancellation (SAIC) Method in GSM Network," in Proceedings of Vehicular Technology Conference, 2004 IEEE 60th, Sep. 26-29, 2004, vol. 5, pp. 3748-3752.

Mostafa, Ayman et al., U.S. Appl. No. 11/088,368, filed Mar. 24, 2005, entitled, "Interference Cancellation and Receive Diversity for Single-Valued Modulation Receivers," 35 pages.

Olofsson, Hakan et al., "Interference Diversity Gain in Frequency Hopping GSM," in Proceedings of Vehicular Technology Conference, 1995 IEEE 45th, Jul. 25-28, 1995, vol. 1, pp. 102-106.

Vainio, "Multistage Adaptive Filters for In-Phase Processing of Line-Frequency Signals," IEEE Instrumentation and Measurement Technology Conference, 1997. vol. 1, May 19-21, 1997, pp. 428-433.

Notice of Allowance mailed Sep. 30, 2008 in U.S. Appl. No. 11/088,368, 9 pages.

Non-Final Office Action mailed Jul. 15, 2008 in U.S. Appl. No. 11/088,368, 10 pages.

Non-Final Office Action mailed Oct. 30, 2007 in U.S. Appl. No. 10/837,933, 13 pages.

Non-Final Office Action mailed Jan. 15, 2008 in U.S. Appl. No. 11/088,368, 10 pages.

Final Office Action mailed May 13, 2008 in U.S. Appl. No. 10/837,933, 17 pages.

Notice of Allowance mailed Sep. 8, 2008 in U.S. Appl. No. 10/837,933, 7 pages.

Extended European Search Report, Jun. 22, 2010 in EP07762035.9, 3 pages.

International Search Report, Apr. 21, 2008, in PCT/US2007/068534 (WO 2007/134090 A3), 2 pages.

Office Action, Jan. 24, 2011, in CA2,646,450, 3 pages.

\* cited by examiner

SYSTEMS AND METHODS FOR INTERFERENCE CANCELLATION IN A MULTIPLE ANTENNA RADIO RECEIVER SYSTEM

CROSS-REFERENCE TO RELATED APPLICATIONS

This application claims benefit of U.S. Provisional Patent Application No. 60/746,843 entitled "SYSTEMS AND METHODS FOR INTERFERENCE CANCELLATION IN A MULTIPLE ANTENNA RADIO RECEIVER SYSTEM," filed May 9, 2006, which application is incorporated herein by reference in its entirety; and is related to U.S. patent application Ser. No. 10/837,933 entitled "SYSTEMS AND METHODS FOR INTERFERENCE CANCELLATION IN A RADIO RECEIVER SYSTEM," filed May 3, 2004, which is incorporated herein by reference in its entirety.

BACKGROUND OF THE INVENTION

1. Field of the Invention

This application relates to interference cancellation in a multiple antenna receiver, specifically as such interference cancellation applies to wireless telecommunications.

2. Description of the Related Art

When observing a cocktail party, a few characteristics relating to the sound are readily apparent. One is that individual conversations can be heard by the participants of those individual conversations and by those in close proximity thereto. The second is that to a person not taking part in a conversation and also not within close proximity to any individual conversation, the collective noise of the many conversations can be heard, but no individual conversation can be discerned from the general noise. In the first instance, the conversations can be heard because the signal (i.e., voice) to interference ratio is strong within close proximity to the speaker. In the second instance, the signal to interference ratio is low, and therefore interference from multiple conversations masks the individual conversations. Both observations, however, highlight the role that interference can have on sound quality.

The same phenomenon is applicable to wireless communications. Interference degrades performance, and unless the signal to interference (noise) ratio is sufficiently high, no particular signal can be discerned. In simplistic terms, that means the voice on the other end of a cellular telephone call may not be heard by a receiver of the call if the interference is too strong. Accordingly, cellular and other wireless communications systems have been designed to insure that the signal received by the wireless device is sufficiently strong relative to the interference such that the voice (and data) can be heard and understood.

Mobile telecommunication service providers and vendors are constantly striving to improve the quality and performance of cellular telephone communications. One such area of focus is the reduction of the interference caused from either (1) adjacent frequency carriers of a cellular base station, known by those skilled in the art as "adjacent channel interference," or (2) adjacent cellular base stations operating at the same frequency carrier, known by those skilled in the art as "co-channel interference." The problem of interference is exacerbated when the cellular system is operating within a tight frequency spectrum, especially and including GSM with a high traffic load.

As will be appreciated by those skilled in the art, similar to the so-called cocktail party problem, the interference observed by a cellular telephone multiple antenna receiver is a summation of individual interference from each of a variety of sources. Such sources of interference include, inter alia, adjacent channels within a base station and co-channel and adjacent channels from surrounding base stations, and may include interference from other sources as well. Because nothing is known about the individual signals causing the interference, it is difficult to extract the original voice signal; hence the cocktail party problem arises.

There are known techniques for reducing or canceling the noise in certain circumstances. For example, in analyzing the summation of multiple interference signals, it is possible to determine whether one particular interference source is dominant over the others contributing to the summation. A simple measure to capture this is the Dominant to the rest of Interference Ratio (DIR), which is the ratio of the power of the dominant interferer to the sum of the powers of the rest of the interferers plus $N_o$. This ratio is defined as:

$$DIR = \frac{I_{max}}{\sum_k I_k - I_{max} + N_0}$$

where $I_{max}$ is the average power of the dominant interfering signal (co- or adjacent channel interference) and $N_o$ is thermal noise of the system. In the case where there is a DIR much greater than one (1), there is typically a dominant interferer. In the case where the DIR is less than or approximately equal to one (1), then there is no dominant interferer.

Manufacturers and others in the telecommunications industry have been addressing the interference problem by designing interference cancellation features into their systems. One way to combat the interference is to use frequency hopping where the interference at a certain frequency will be distributed among multiple frequencies instead of being focused on one frequency. See, for example, "*Interference Diversity Gain in Frequency Hopping GSM*", VTC 95, Hakan Olofsson, et al. Such interference averaging schemes are marginally helpful, but do not quite reduce or cancel the interference source to acceptable levels. Another example of interference mitigation is to use a technique known in the art as "Interference Rejection Combining" (IRC). See, for example, "*A System Performance Evaluation of 2-Branch Interference Rejection Combining*", Stephen Craig et al. Each of the above-cited references is hereby incorporated by reference in its entirety. IRC is marginally effective where there is a dominant interference source, i.e., those systems where the DIR is much greater than one (1). For those situations where there is not a dominant interference source, the interference suppression techniques being developed by those skilled in the art are mostly ineffective and the benefits realized pale in comparison to the cost of implementation.

In various interference suppression techniques outside of the cellular telephone industry, there exist various methodologies relating generally to interference suppression. Using those known techniques, those skilled in the art will appreciate that if there is a series of N antennas forming a system, interference can be suppressed for all but one (N−1) of those antennas. This is because at least two actual signals must be observed for the known suppression algorithms to be applicable.

U.S. Patent Application of Meyer et al., Publication No. U.S. 2002/0141437 (the "Meyer Application") addresses a method for interference suppression for TDMA and/or FDMA transmissions, with an arbitrary number of receive antennas. The Meyer Application discloses a real value modulation technique wherein the real component of a received signal is separated from an imaginary component of the received signal. The measured received signal is phase shifted from the transmit signal due to channel oscillation and other factors. The received signal is then projected back onto the real axis. The methodology assumes signal and part of interference are orthogonal and, as such, the real and imaginary part of the signal can be exploited to cancel the interference. The methodology described in the Meyer application is sensitive to the actual data comprising the signal, including some of the embedded data signals such as the training sequence. Also, the complexity of the calculations appears to be significantly higher than the complexity of the present invention. Because of this, the technique is unreasonable to implement in a large-scale wireless telecommunication system.

Another method of interference cancellation, involving at least two antenna systems, is combining algorithms, including a "switching combining algorithm" wherein one of the signals is ignored at any given point in time, and an "interference ratio combining algorithm wherein each signal is whitened in accordance with its signal-to-interference ratio. Again, the problem with these types of combining algorithms is that they require the observations to be independent in order to provide reasonable gain. As will be appreciated by those skilled in the art, the ability to receive highly independent receive signals within the small footprint of a handset is a very challenging task.

SUMMARY OF THE INVENTION

An improved method and apparatus for interference cancellation in a multiple antenna system is provided herein. In one embodiment a multiple antenna receiver is provided that includes a whitening filter coupled to receive processed signals corresponding to signals received at respective antennas, and to generate whitened signals corresponding to each of the received signals, the whitened signals having a colored noise component whitened, the whitening filter coupled to determine the whitened signals, at least in part, utilizing symbols corresponding to the signals received by the plurality of antennas.

In another embodiment, a method is provided that includes receiving a plurality of signals in respective antennas of a multiple antenna receiver. The method further includes processing the received signals to generate respective processed signals, each of the received signals including a colored noise component and applying a whitening filter to respective processed received signals to generate whitened signals, the whitened signals having the colored noise component whitened, the whitening filter determining the whitened signals, at least in part, utilizing symbols corresponding to the signals received by the plurality of antennas.

The methodology of the present invention may be applied to various wireless technologies, including TDMA, CDMA, GSM, EDGE, WCDMA, 802.11 and 802.16, using any of a variety of modulation techniques, including GMSK, QPSK, 8PSK, and OFDM.

The present invention may be embodied in a multiple antenna receiver used in such wireless communications. The multiple antenna receiver preferably implements the present invention in conjunction with a separation algorithm optimized for the particular technology in order to increase the quality of the received signal. Such a multiple antenna receiver would then be useful in a system in which the co-channel interference and adjacent channel interference may be increased in order to obtain significant capacity increases in the network.

The present invention also may be embodied in the uplink stage of n multi-receivers in a Base Station Transceiver Subsystem (BTS). As such, not only could the interference cancellation algorithm be utilized in a conventional manner for n−1 of those multiple receivers, but rather the present invention enables cancellation of interference for all n of such individual receive antennas in the BTS.

While the present invention has been described in terms of cellular mobile radio telecommunications systems, the invention is applicable across a broad range of applications and devices wherein single or multiple antennas receive signals that are susceptible to various types of interference.

As set forth in the detailed description of the preferred embodiment, including the graphical results set forth therein, the present invention has achieved results far exceeding those which would be reasonably expected by those skilled in the art attempting to solve the interference problem in wireless communications.

BRIEF DESCRIPTION OF THE DRAWINGS

Reference will now be made in detail to the preferred embodiments of the present invention, examples of which are illustrated in the accompanying drawings, and wherein like reference numerals identify like or similar structures or processes and wherein.

DETAILED DESCRIPTION OF THE PREFERRED EMBODIMENT

Figure 1:
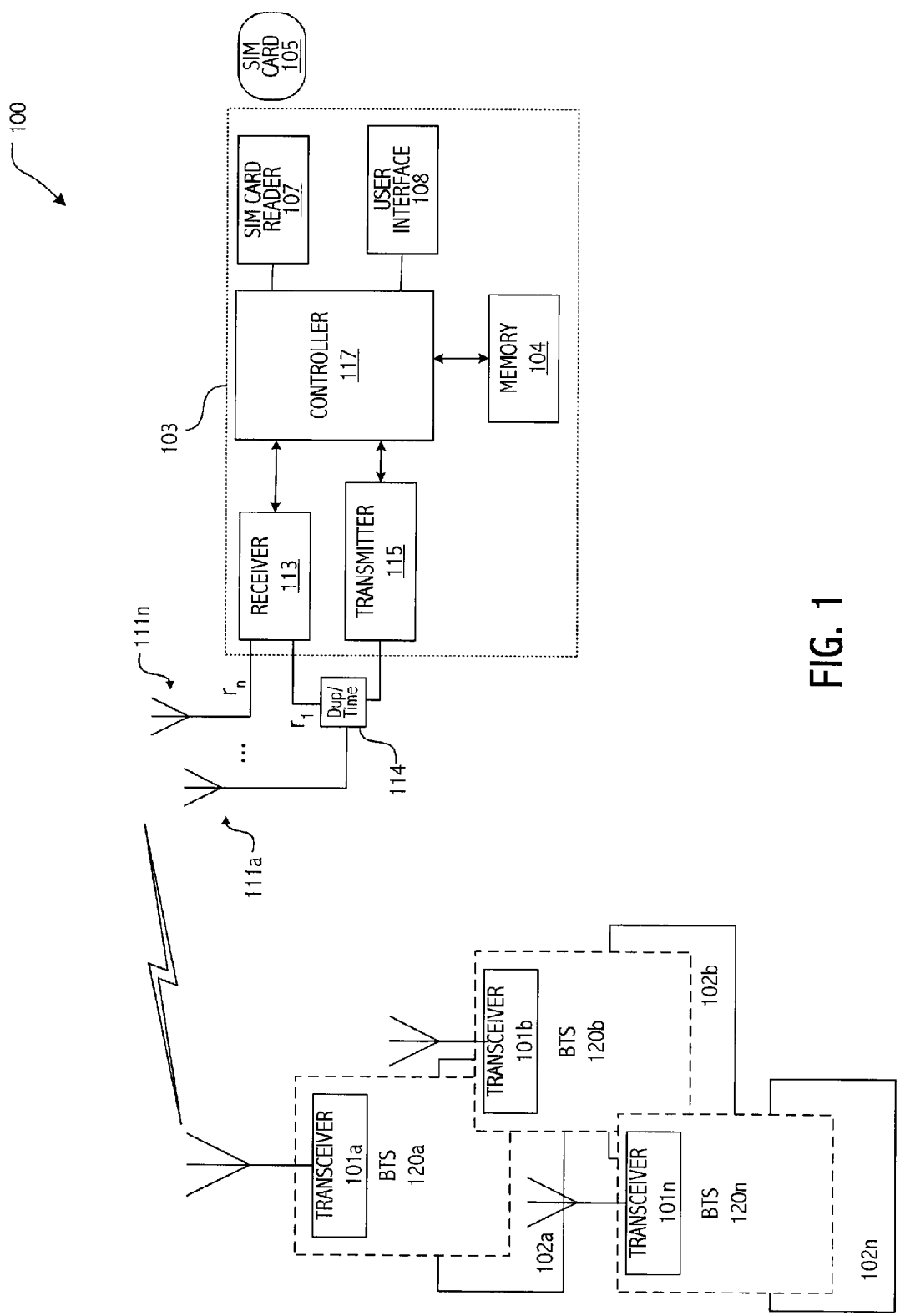
FIG. 1 is a block diagram of a portion of a wireless communication system showing the main functional components of a multiple antenna receiver constructed in accordance with the teachings of the present invention.

The exemplary embodiments described herein are preferably applied to interference cancellation for a wireless downlink channel, i.e., a channel conveying information from a cellular antenna transceiver or base station of a wireless cellular system to a multiple antenna receiver, and to apparatus and methods that may be implemented in a wireless communications terminal, for example, a cellular radiotelephone, wireless capable personal digital assistant (PDA) or similar communications device. The present invention is also applicable in an alternative embodiment wherein multiple receive antennas in a wireless cellular system, e.g., a base station multiple antenna receiver, desire interference cancellation in order to enhance signal quality and capacity. It will be further appreciated, however, that the present invention may be used in other environments, e.g., in other types of wireless multiple antenna applications in which traditional interference cancellation techniques are not available or are less effective.

This application utilizes various acronyms throughout the specification and drawings. For convenience, unless otherwise set forth in the text, those acronyms are defined as follows:

AFC—Automatic Frequency Correction
AWGN—Additive White Gaussian Noise
BTS—Base Transceiver Subsystem (or Base Station)
BER—Bit Error Rate
CDMA—Code Division Multiple Access
C/I—Carrier to Interferer Ratio
DFSE—Decision Feedback Sequence Estimator
DIR—Dominant Interferer Ratio
DSP—Digital Signal Processing
EDGE—Enhanced Data rates for Global Evolution
FDMA—Frequency Division. Multiple Access
GMSK—Gaussian Minimum Shift Keying
8PSK—8 (constellation) Phase Shift Keying
GPRS—Generalized Packet Radio System
GSM—Global System for Mobile Communications
MLSE—Maximum Likelihood Sequence Estimation
OFDM—Orthogonal Frequency Division Multiplexing
QPSK—Quaternary Phase Shift Keying
RSSE—Reduced State Sequence Estimation
SAIC—Single Antenna Interference Cancellation
TDMA—Time Division Multiple Access
TSC—Training Sequence Code
WCDMA—Wide-band CDMA With reference to FIG. 1, there is shown a GSM wireless system 100 with a mobile device 103 and multiple cellular antenna transceivers 101a, 101b . . . 101n (generically referred to hereinafter as 101). The present invention may be implemented in any type of mobile telecommunications system 100, including a GSM/GPRS telecommunications system in which there is a mobile multiple antenna receiver 113 that is subject to interference. Implicit in the adaptability to various types of networks is the adaptability to the various encoding schemes associated with those networks, i.e., GMSK for GSM. The methods set forth as part of the invention herein are applicable for other coding schemes as well, including QPSK (TDMA), 8PSK (EDGE and WCDMA), OFDM (e.g. 802.11; 802.16). The whitening filter and filtering methodology of the present invention is valid for single-valued modulation such as GSM and BPSK and other single-valued modulation techniques. However, as will be understood by those in the art, coding schemes such as QPSK and 8-PSK use vector value modulation and hence may not achieve as significant a benefit from the inherent diversity nature of the whitening filter and filtering methodology presented herein.

FIG. 1 illustrates an exemplary GSM wireless system 100 according to an embodiment of this invention. The wireless system 100 comprises a plurality of BTS 120a . . . 120n having a plurality of cellular antenna transceivers 101a . . . 101n in communication with a mobile device 103 using a plurality of multiple antennas 111a . . . 111n. For simplicity, a plurality of BTS 120a . . . 120n and a plurality of cellular antenna transceivers 101a . . . 101n will be referred to as BTS 120 and transceiver 101, respectively. Similarly, the plurality of multiple antennas will hereinafter be referred to as multiple antenna 111. Some of the components of the mobile device 103 are either generally known in the art or based on those generally known in the art, although functionally some of those components have been modified or enhanced as described herein with respect to the present invention. With multiple antennas, the transmitter is coupled to utilize antenna 111a through Duplexer/Time switch element 114. The mobile device 103 includes a controller 117, such as a microprocessor, microcontroller or similar data processing device that executes program instructions stored in a memory 104. As known in the art, each of the multiple antennas 111 receives independent and separate representations of the signal transmitted from transceiver 101. The use of both signals to reproduce the transmitted signal allows the receiver 113 to produce a more accurate representation of the transmitted signal. It should be appreciated that any number of multiple antennas 111 may be used without departing from the scope of this invention.

In the description of a preferred embodiment in which the multiple antenna interference cancellation occurs in the mobile device 103, the cellular antenna transceivers 101 require no modification from that known in the art. Each of the cellular antenna transceivers 101 are typically operated in sectors 102a, 102b, 102n (generally 102), and may, for example, comprise three sectors per cellular antenna transceiver 101. Each of the sectors transmits to a mobile device 103 in accordance with its own frequency mapping and its own training sequence code (TSC).

The memory 104 may be implemented using any appropriate combination of alterable, volatile or non-volatile memory or non-alterable, or fixed memory. The alterable memory, whether volatile or non-volatile, may be implemented using any one or more of static or dynamic RAM, a floppy disk and disk drive, a writable or re-writable optical disk and disk drive, a hard drive, flash memory or other alterable memory components known in the art. Similarly, the non-alterable or fixed memory may be implemented using any one or more of ROM, PROM, EPROM, EEPROM, an optical ROM disk, such as a CD-ROM or DVD-ROM disk, and disk drive or other non-alterable memory known in the art.

The controller 117 may be implemented as a single special purpose integrated circuit (e.g., ASIC) having a main or central processor unit for overall, system-level control, and separate sections dedicated to performing various specific computations, functions and other processes under the control of the central processor unit. The controller 117 can also be implemented as a single microprocessor circuit, DSP, or a plurality of separate dedicated or programmable integrated or other electronic circuits or devices, e.g., hardwired electronic or logic circuits such as discrete element circuits or programmable logic devices. The controller 117 may also include other circuitry or components, such as memory devices, relays, mechanical linkages, communications devices, drivers and other ancillary functionality to affect desired control and/or input/output functions.

The controller 117 is operatively coupled with user interface 108. The user interface 108 may include items known in the art, such as a display, keypad, speaker, microphone, and other user interface I/O components. The controller 117 also controls the functions and operation of the SIM card reader 107, which typically is in communication with the SIM card 105 during operation of the mobile device 103. As is known in the art, the SIM card 105 typically stores information relating to the user, such as subscribed features, attributes, identification, account and other information that customizes a mobile device 103 for a typical user. The controller 117 also controls and/or monitors the operations of the transmitter 115 that transmits radio frequency (RF) signals to the cellular antenna transceiver 101 of a base station via the multiple antenna 111 coupled to the mobile device 103. The controller 117 is also operatively connected to multiple antenna receiver 113, the functionality of which will be discussed in greater detail below.

Figure 2:
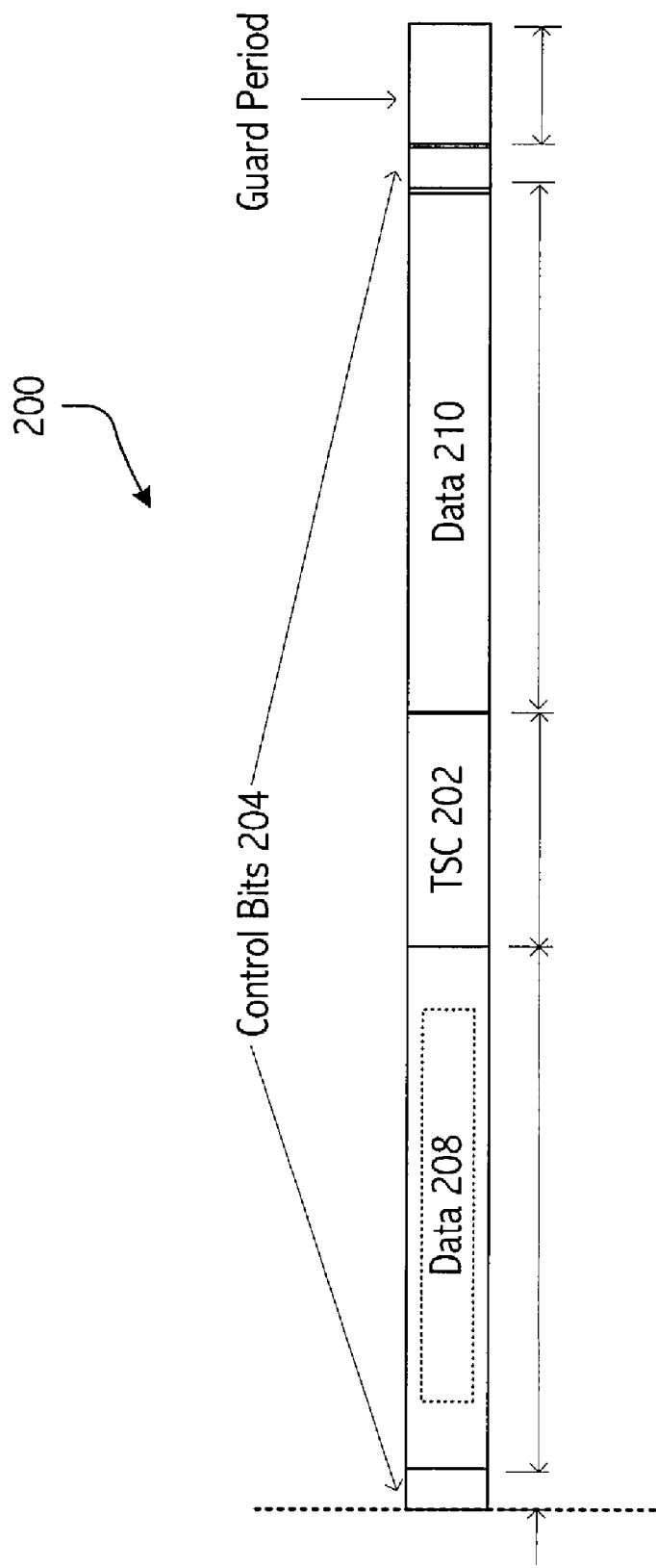
FIG. 2 is an example of a typical GSM data stream in which the Training Code Sequence is shown.

As illustrated in FIG. 2, the TSC 202 is typically a 26 bit code embedded in a transmission burst 200 from cellular antenna transceivers 101 and used as an identifier for all mobile devices 103 in a particular sector 102. FIG. 2 illustrates a typical burst configuration. A particular TSC 202 is typically assigned to a sector 102 or a cell. Since there are a total of 8 TSC codes, cells within the network reuse TSC codes. In a typical GSM configuration, each cellular antenna transceiver 101 transmits a burst every 4.7 milliseconds, or over 200 bursts per second. The TSC 202 may be embedded in the middle of the transmission burst 200 along with control bits 204 and data bits 208, 210 in accordance with system design and/or industry standards. In a hand-off to the next antenna, the TSC 202 parameter for the new sector 102 is conveyed to the mobile device 103 along with the assigned frequency and time slot. As such, the TSC 202 is a known parameter in any mobile telecommunications system 100 and all types of mobile devices 103 are capable of identification thereof.

The present invention utilizes the TSC 202 in performing the antenna interference cancellation algorithm. That algorithm as applied to a multiple antenna system will be described below, followed by a detailed description of a preferred embodiment of that algorithm within a mobile telecommunications system 100 and mobile device 103.

The received desired signal output at a receive filter (RX filter 322 of FIG. 3) within the mobile device 103 for the i antenna branch can be written as:

$$r_{d\,i}(k) = \sum_{n=0}^{L_{id}-1} h_{id}(n)d(k-n) \quad (1)$$

$$r_{int\,ij}(k) = \sum_{n=0}^{L_{ij}-1} h_{ij}(n)I_j(k-n) \quad j=1\ldots,N$$

wherein
$r_{di}(k)$ is the desired signal received for the 'i' branch,
$r_{int\,ij}(k)$ is the received 'j' interferer signal received at the 'i' branch,
$d(k)$ are the desired transmitted data symbols,
$I_j(k)$ are the interferer transmitted data symbols from 'j' interferer at the 'i' branch,
$h_{ij}(n)$ is the effective channel impulse of the 'j' interferer for the 'i' branch,
$h_{id}(n)$ is the effective channel impulse of the desired signal for the 'i' branch,
$L_{id}$ is the length of the effective channel impulse response of the desired signal, and
$L_{ij}$ is the length of the effective channel impulse response of the 'j' interferer.

The effective channel impulse response is defined as the convoluted, transmitted received filters and the media response and can be represented by the following equation:

$$h_{eff}(n)=tx(n)*C(n)*rx(n) \quad (2)$$

wherein
  $tx(n)$ is the filter response of the linearized GMSK filter as defined in the 3GPP, GERAN Standards (which are hereby incorporated by reference);
  $rx(n)$ is the multiple antenna receiver filter; and
  $C(n)$ is the media response For generality, assume that there are N interferers and M receiver branches. Moreover, for simplicity, the length of the effective channel impulse response of the desired signal and the interferer signal is assumed to be the same for the different multiple antenna receiver branches.

Description of the Separation Algorithm:

A general algorithm for separating multiple received signals (desired and interferers) based on the composite of the received signals will be described. Assume M received signals through M branch antennas based on the desired signal and N interferers. We can express the received signal as follows:

$$r_1(k)=h_{1d}\otimes d(k)+h_{11}\otimes I_1(k)+h_{12}\otimes I_2(k)+\ldots$$
$$h_{1N}\otimes I_N(k)+w_1(k)$$

$$r_2(k)=h_{2d}\otimes d(k)+h_{21}\otimes I_1(k)+h_{22}\otimes I_2(k)+\ldots$$
$$h_{2N}\otimes I_N(k)+w_2(k)$$

.

.

.

$$r_M(k)=h_{Md}\otimes d(k)+h_{M1}\otimes I_1(k)+h_{M2}\otimes I_2(k)+\ldots$$
$$h_{MN}\otimes I_N(k)+w_M(k) \quad (3)$$

where
  $r_i(k)$ is the received signal for branch 'i';
  $d(k)$ is the desired signal;
  $w_i(k)$ is the AWGN signal received in the branch 'i';
  $I_j$ is transmitted from an interfering source;
  $\otimes$ indicates convolution operator Note that in the equation above the "$h_{ij}\otimes I_j(k)$" terms represent colored noise while the $w_i(k)$ terms represent white Gaussian noise. Note also that $r_1(k)\ldots r_M(k)$ may have some degree of correlation and that it is not necessary for such receive signals to be totally de-correlated.

For two diversity branches, equation (3) can be written as $$r_1(k)=r_{d\,1}(k)+r_{int\,1}(k)$$

$$r_2(k)=r_{d\,2}(k)+r_{int\,2}(k) \quad (4)$$

wherein:

$$r_{d\,i}(k) = \sum_{n=0}^{L_d-1} h_i(n)d(k-n) \quad (5)$$

$$r_{int\,i}(k) = \sum_{j=1}^{N}\sum_{n=0}^{L_j-1} h_{ij}(n)I_j(k-n)+w_i$$

and wherein $r_{di}(k)$ is the desired signal received at the "i" branch, $r_{int\,i}(k)$ is the composite interference and noise signal received at the "i" branch, and n is the number of interferers.

While the present invention may utilize any number of existing known algorithms, including the combining algorithms or the real-value modulation set forth above, the methodology of the present invention preferably uses independent component analysis, or ICA and applies it to the experience of the multiple antenna wireless device. ICA is known by those skilled in the art as a statistical model where the observed data is expressed as a linear combination of underlying latent variables. In ICA, the latent variables are assumed non-Gaussian and mutually independent, which assumptions apply to a wireless device antenna as well. The task is to find out both the latent variables and the mixing process. The ICA model used is $$x = As$$

where $x=(x_1, x_2, \ldots x_n)$ is the vector of observed random variables and $s=(s_1, s_2, \ldots s_n)$ is the vector of statistically independent latent variables called the independent components, and A is an unknown constant mixing matrix. ICA is very closely related to blind source separation (BSS), where a "source" means the original signal, such as the original voice transmission (or the speaker at a cocktail party). Independent component analysis is described in more detail in the literature, for example in Hyvärinen and Oja, *Independent Component Analysis: A Tutorial*, Helsinki University of Technology, Laboratory of Computer and Information Science, April 1999, and Bingham and Hyvärinen, *A Fast Fixed-Point Algorithm for Independent Component Analysis of Complex Valued Signals*, Neural Networks Research Centre, Helsinki University of Technology, 19 Jan. 2000, each of which is incorporated herein by reference.

In a preferred embodiment, the separation algorithm is carried over the training sequence, that is, the separation algorithm is only performed over the training sequence symbols in the middle of the burst and not over the whole burst. That is, in a multiple antenna system, the TSC 102 is utilized in all representations of the received signals ($r_1 \ldots r_i$). While it is preferred to use the received symbols in the TSC 202 location of the transmission burst 200, for multiple sensors applications (that is, multiple receive branches), the separation algorithm may be carried over any portion of the received burst. For example, certain portions of a transmission burst 200 may be pre-defined and used in lieu of or in addition to the TSC 202.

A preferred separation algorithm to be used is based on the central limit theory. As will be appreciated by those skilled in the art, unless the independent components comprising interfering signals are Gaussian, the sum of those independent components tends to be more Gaussian than each of the individual components. For the purposes of this illustration, it is assumed that distribution of the original (or separated) signals is non-Gaussian and mutually independent, which is typically true in a GSM environment with the exception of the simulcast. Moreover, there are many iterative algorithms that may be used, with the rate of convergence and complexity being factors in an implementation decision. Note that the duration of a GSM transmission burst 200 is about 0.57 msec and, therefore, it may be safely assumed that the channel does not change over the course of the burst. There are two other assumptions in the separation algorithm, namely, that at most, one of the independent components, $d_j$, may be Gaussian and the unknown mixing matrix H must be of full rank and assumed to be constant.

In a system wherein $r=(r_1, r_2 \ldots, r_M)$ is the vector of the observed random variables and $d=(d_1, d_2 \ldots, d_M)$ is the vector of statistically independent signals, r and d are combined. The covariance matrix of the observed random variables is given by:

$$E(rr^H) = \begin{pmatrix} C_{11} & \cdots & C_{1M} \\ \vdots & \ddots & \vdots \\ C_{1M} & & C_{MM} \end{pmatrix} \tag{6}$$

where $r^H$ stands for the Hermitian, or conjugate transpose, of r. The covariance matrix is used to whiten the observed random variables to produce a new set of normalized random variables $\bar{r}=(\bar{r}_1, \bar{r}_2 \ldots, \bar{r}_m)$ with zero mean and unit variance. Principle component analysis may be also used to whiten the observed random variables. Therefore, $C_{ij}=E(\bar{r}_i\bar{r}_j^H)=I$ is the covariance of random variables $\bar{r}_i$ and $\bar{r}_j$. It is desired to find a separation matrix S such that:

$$r_{clean} = S^H \bar{r} \tag{7}$$

As will be appreciated by those skilled in the art, the kurtosis, or fourth order statistics, is a measure of non-Gaussianity of a random variable. There are $2^4$ ways to define the kurtosis. The algorithm is used for separating the linearly mixed signals. Among the kurtosis functions commonly used, the following choices are preferred:

$$\text{kurt}(\check{d})=E(|\check{d}|^4)-E(\check{d}\check{d}^*)E(\check{d}\check{d}^*)-E(\check{d}\check{d})E(\check{d}\check{d}^*)-E(\check{d}\check{d}^*)E(\check{d}^*\check{d})$$

$$\text{kurt}(\check{d})=E(\check{d}^4)-2 \tag{8}$$

Note that if $\check{d}$ is Gaussian, the Kurt vanishes—which is intuitive. The kurtosis is used in a Fast Fixed Point algorithm to calculate the updated value at each iteration. See, e.g., Hyvarinen et al, supra. Let $s_p(0)$ be the starting initial vector. Using the Fast Fixed point algorithm and using the first kurtosis definition in (6), the updated value is given by:

$$s_p(m+1)=s_p(m)+2*E\{\bar{r}(s_p^H(m)\bar{r})^*-2s_p^H(m))$$
$$|(s_p^H(m)\bar{r})|^2 \tag{9}$$

The new value is normalized $$s_p(m+1) = \frac{s_p(m+1)}{\|s_p(m+1)\|} \tag{10}$$

A convergence is reached when the condition $|s_p^H(m+1)s_p(m)|\approx 1$ is met, otherwise iteration continues. To avoid convergence to the previously found $s_p$, a deflation method based on Gram-Schmidt is applied where the estimated vector $S_p(m+1)$ at each iteration is subtracted from the previously 'p' found vectors. To estimate the N independent components, the algorithm needs to be executed N times. The algorithm can be prevented from converging into the previously found component by selecting a new starting vector that is orthogonal to the previously found ones.

The other signals are separated using a deflation method. The deflation tends to separate the independent component in the order of decreasing non-Gaussianity, which is often equal to decreasing the importance of the independent signals.

$$s_p(m+1) = s_p(m+1) - \sum_{j=1}^{P} s_j s_j^H s_p(m+1) \tag{11}$$

Description of the Temporal Whitening Filter:

In an interference-limited environment the received interference is often considered a colored noise (samples are correlated in time), especially in the case of single or two interference case. Exemplary embodiments of whitening filters for use in a multiple branch receiver are discussed in additional detail herein. Note that other adaptations of whitening filters may be made based on the teachings herein to account for the colored aspect of the received noise in a multiple branch antenna. In exemplary embodiments described herein, whitening is applied to multiple branches where each branch could have a single or multiple interferers.

The key equations of a whitening filter that may be utilized in various embodiments of the present invention will now be described. Equation (1) may be re-written as $$r_z(k) = \sum_{n=0}^{L-1} h_d(n)d(k-n) + u(n) \qquad (12)$$

where u(n) is the contribution of the interference including the thermal noise and is mostly color noise, and $r_z(k)$ is the input signal to a whitening filter The color noise, u(n), as a random variable can be predicted using a one step predictor as $$\tilde{u}(n \mid n-1) = \sum_{l=1}^{M} w_l u(n-l), \qquad (13)$$

wherein M is the order of the predictor and $w_1$ is the filter coefficient of the forward predictor. Therefore, the forward prediction error is given by:

$$e(n) = u(n) - \hat{u}(n \mid n-1) \qquad (14)$$

Applying a whitening filter to a GSM signal (inherent correlated quadrature modulation) and to a multi-branch antenna is believed to be new along with how it is modeled to reduce the interference.

After a detailed and lengthy manipulation, it can be shown that $$r_z(k) = \sum_{j=0}^{M+L-1} h_{fil}(j)d(k-j) + \sum_{l=1}^{M} w_l r_z(k-l) + e(k) \qquad (15)$$

where $h_{fil}$ is the filtered extended channel estimate for the desired channel and e(k) is a white Gaussian noise random variable. Moreover, $h_{fil}$ can be given by $$h_{fil} = h_d * f \qquad (16)$$

$$f(l) = \begin{pmatrix} 1 & l=0 \\ -w_l & l>0 \end{pmatrix}$$

where

At this point, the goal is to find a joint estimate of the channel condition of the desired signal and the parameters $w_1$, that approximate the colored noise.

Ignoring the noise term, Equation 15 can be put in the following matrix form $$\begin{bmatrix} r_z(k) \\ r_z(k+1) \\ \vdots \end{bmatrix} = \begin{bmatrix} d(k) & d(k-1) & d(k-(M+L-1)) & r_z(k-1) & r_z(k-2) & \ldots & r_z(k-L) \\ d(K+1) & \ldots & & & & \ldots & r_z(k-L+1) \\ \vdots & \ldots & & & & & \end{bmatrix} \begin{bmatrix} h_{fil}(0) \\ h_{fil}(1) \\ \ldots \\ w_l(1) \\ \ldots \\ w_l(M) \end{bmatrix} \qquad (17)$$

$$r(k) = d(k-1)h \qquad (18)$$

where $$d(k-1) = [d(k) \; d(k-1) \; \ldots \qquad (19)$$
$$d(k-(M+L-1)) \; r_z(k-1) \; r_z(k-2) \; \ldots \; r_z(k-M)]]$$

and $$h = \begin{bmatrix} h_{fil}(0) \\ h_{fil}(1) \\ \ldots \\ w_l(1) \\ \ldots \\ w_l(M) \end{bmatrix}$$

using the Minimum Mean Square Estimate (MMSE) for equation 18, we obtain $$P = Rh \qquad (20)$$

$$h = R^{-1}P \qquad (21)$$

Where $$R = E\{d(k-1) \; d(k-1)^H\} \qquad (22)$$

and $$P = E\{d(k-1) \; r(k)^H\}$$

and $$h = \begin{bmatrix} h_{fil}(0) \\ h_{fil}(1) \\ h_{fil}(M+L-1) \\ \ldots \\ w_l(1) \\ \ldots \\ w_l(M) \end{bmatrix}$$

Where E{ } indicates the expectation operator and "H" indicate the Hermitian operator. The covariance matrix of the received signal is given by $$\sigma^2 = E\{r_z(k)r_z(k)^H\} \qquad (23)$$

and the minimum mean square estimate is given by $$\sigma_r^2 = \sigma^2 - P^H R^{-1} P \qquad (24)$$

An embodiment takes advantage of the inherent diversity of the GMSK modulation. To do so, it is preferred to separate the real and imaginary parts of the received signal as if they were independent branches. Therefore, equation 15 can rewritten as:

$$x(k) = \sum_{j=0}^{M+L-1} h_{xfil}(j)d(k-j) + \sum_{l=1}^{M} w_{lxx}x(k-l) + \sum_{l=1}^{M} w_{lyx}y(k-l) + e_x(k) \quad (25)$$

and $$y(k) = \sum_{j=0}^{M+L-1} h_{yfil}(j)d(k-j) + \sum_{l=1}^{M} w_{lyy}y(k-l) + \sum_{l=1}^{M} w_{lxy}y(k-l) + e_y(k)$$

where $$r_z(k) = x(k) + jy(k)$$

$$h_{fil}(j) = h_{xfil}(j) + jh_{yfil}(i)$$

The first term of x(k) is the hypothesized component. The remaining summation terms are colored noise from interferers and the final term ($e_x(k)$) is white Gaussian noise. Thus, in the single antenna system, the x and y component contribute to the colored noise. Note that d(k−1), r(k) and h are now modified to be described in Equation 26 below.

$$d(k-1) = \begin{bmatrix} d(k) \; d(k-1) \; \ldots \; d(k-(M+L-1)) \; x(k-1) \\ x(k-2) \; \ldots \; x(k-M) \; y(k-1) \; y(k-2) \; \ldots \; y(k-M)] \end{bmatrix} \quad (26)$$

$$r(k) = \begin{pmatrix} x(k) \\ y(k) \end{pmatrix}$$

$$h = \begin{bmatrix} h_{xfil}(0) & : & h_{yfil}(0) \\ h_{xfil}(1) & : & h_{yfil}(1) \\ \ldots & : & \ldots \\ h_{xfil}(M+L-1) & : & h_{yfil}(M+L-1) \\ w_{xxl}(1) & : & w_{lxy}(M) \\ \ldots & : & \ldots \\ w_{lxx}(M) & : & w_{lxy}(M) \\ w_{yxl}(1) & : & w_{byy}(1) \\ \ldots & : & \ldots \\ w_{lyx}(M) & : & w_{lxy}(M) \end{bmatrix}$$

A joint Minimum Mean Square Estimate (MMSE) is carried out for equation (18) to yield the coefficients in 'h'.

Note that the above algorithm can run at the sample or at the symbol level. In the preferred embodiment, the algorithm runs at an oversampling factor of 2 where a tradeoff between the complexity and performance was maintained. There preferably should be a decimating block after the filter block if over-sampling is used.

In a multiple antenna system, which takes advantage of the inherent diversity of the GMSK modulation, and separates the real and imaginary parts of the received signal, equation 25 can be rewritten as equation 27 shown below:

$$x_i(k) = \sum_{j=0}^{M+L-1} h_{x_i fil}(j)d(k-j) + \quad (27)$$

$$\sum_{j=1}^{N}\sum_{l=1}^{M} w_{lx_j x_i} x_j(k-l) + \sum_{j=1}^{N}\sum_{l=1}^{M} W_{ly_j x_i} y_j(k-l) + e_{x_i}(k)$$

$$y_i(k) = \sum_{j=0}^{M+L-1} h_{y_i fil}(j)d(k-j) + \sum_{j=1}^{N}\sum_{l=1}^{M} w_{ly_j y_i} y_j(k-l) +$$

$$\sum_{j=1}^{N}\sum_{l=1}^{M} W_{lx_j y_i} x_j(k-l) + e_{y_i}(k)$$

Each separated signal $x_i(k)$, $y_i(k)$ includes the hypothesized component plus color noise contributions from all the x and y components from all the multiple antennas. The final term represents white Gaussian noise for the particular x or y component for the branch. For a two antenna system, given equation 27, the signal received at x branch of the first antenna ($x_1$) is expressed as follows:

$$x_1(k) = \quad (28)$$

$$\sum_{j=0}^{M+L-1} h_{x_1 fil}(j)d(k-j) + \sum_{l=1}^{M} w_{lx_1 x_1}(K-l) + \sum_{l=1}^{M} w_{1x_2 x_1}(k-1) +$$

$$\sum_{l=1}^{M} w_{ly_1 x_1} y_1(k-1) + \sum_{l=1}^{M} w_{1y_2 x_1} y_2(k-1) + e_{x1}(k)$$

Thus, the received signal $x_1(k)$ in equation 28 can be seen to be made up of the hypothesized component plus noise contributions from the x1 branch, the x2 branch, the y1 branch, and the y2 branch, along with a white Gaussian noise component. Note that the summation terms represent the channel memory (length of the channel impulse response). For typical GSM systems, the channel length M is typically equal to 3 or 4 because most of the energy is in the first three or four symbols. Note that morphology, for example, urban terrain versus flat rural areas, can affect the amount of information in the channel memory.

Detecting Interference Signals

In an alternative embodiment, after separating the desired signal the hypothesized signal $r_{d2}(k)$ is constructed over the training sequence or any known signaling part of the burst for some or all training sequence codes available for all interfering signals to be separated. The new hypothesized signal $r_{d2}(k)$ is fed to the separation algorithm along with the composite received signal to separate that particular interferer. The process repeats until all interferers of interest are separated.

All separated interferers are fed to a revised (or whitened) channel estimate function separately where a revised value of the channel estimate is obtained. The new revised (or whitened) channel estimation for the desired signal and each separated interferer is fed to the multiple-input equalizer, by way of a prefilter, separately for signal detection. A revised Automatic Frequency Correction (AFC) loop using the detected bits of the multi-branch equalizer is used to maintain and to track offset of the desired signal and each interferer signal.

Gain Saturation of the Separation Function:

The separation algorithm converges to the desired signal and separates the interferers. The separation process works well for low C/I ratios because composite signals comprise a mixture of carriers and more closely resemble a Gaussian signal than does a single carrier. For high C/I ratios, that is not the case and convergence of the separation function may intermittently slip. Therefore, it is desirable to build a control function that examines the C/I ratios and then bypasses the separation algorithm for high C/I ratios. With a high C/I ratio with a dominant desired signal, the C/I estimation is rather straightforward and a simple finite state machine may be used to choose the signal to be passed to the multiple-input equalizer.

Figure 4:
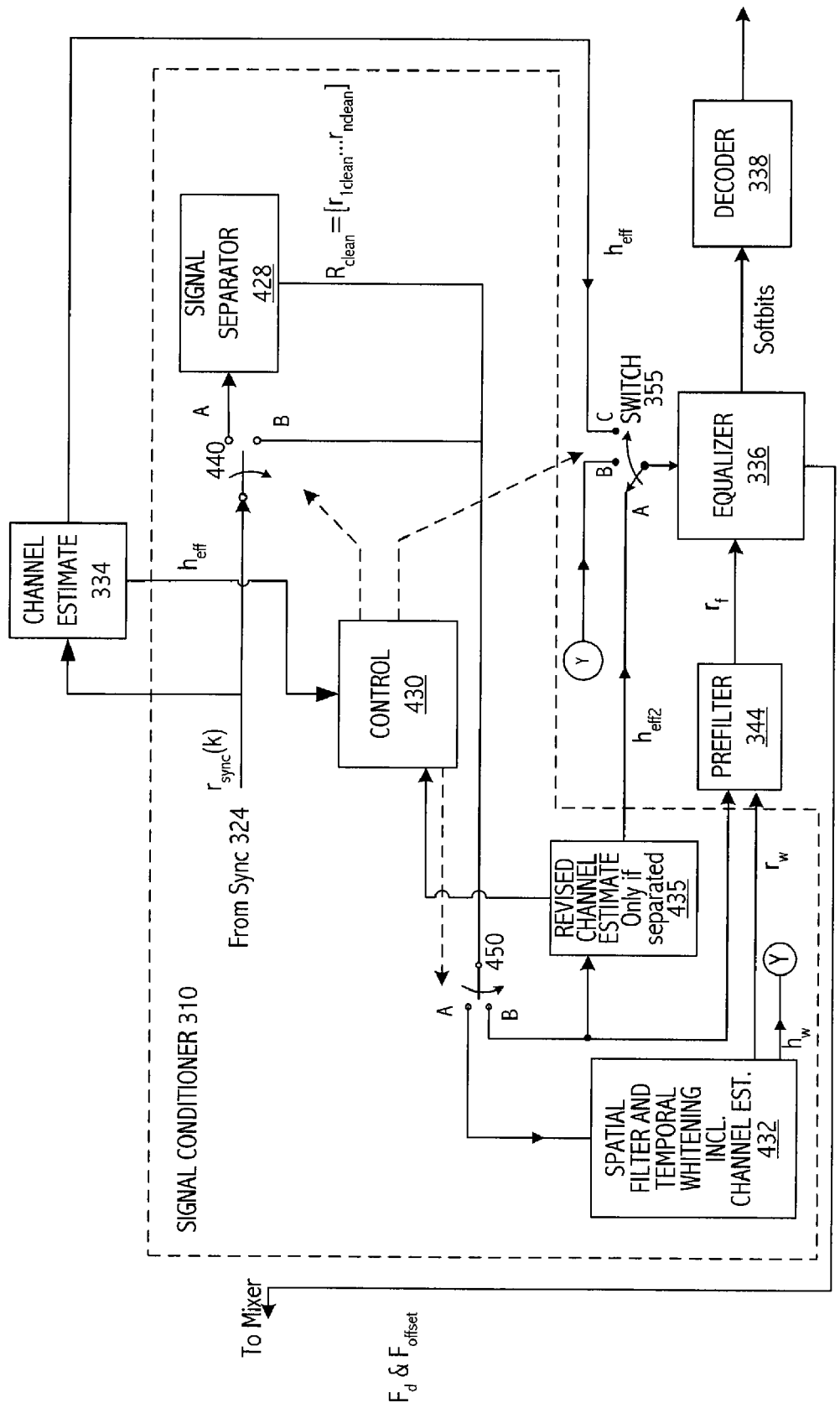
FIG. 4 is a block diagram of the signal conditioner functional component of the multiple antenna receiver illustrated in FIG. 3.

Bypassing the Separation Function:

The controller function box 430, shown in FIG. 4, compares the initial and revised (or whitened) C/I estimation and performs the separation function when both values are reasonably close and exceeded a predetermined threshold $(C/I)_{thresh}$. In an alternative embodiment, if the initial channel estimation exceeds a predetermined $(C/I)_{thresh}$, the control switch may bypass the separation and filtering function altogether. This may be desired if minimum processing is required to conserve device battery resources.

The desired separated signal is given by:

$$r_{clean} = Sr_1 \qquad (29)$$

The signal is then fed to an MLSE-based multi-branch equalizer for signal detection which can, for example, be implemented using Viterbi algorithm.

Application to Multiple Antenna Devices:

Referring again to FIG. 1, for multiple antenna devices, there are multiple representations of the desired signal received by the multiple antenna receiver 113, of which, each representation is applied to the separation function in the multiple antenna receiver. This assumption is valid for all known used wireless modulation techniques and is not specific to a modulation type. For example, embodiments of the current invention may be used for 4-PSK (and its derivatives QPSK), (QPSK, pi/4-QPSK . . . etc), 8-PSK, QAM-n (n=4, 16, 64) and it is not limited to real-valued modulation. Note that the algorithm used here is not limited to inherent diversity gain. However, the approach herein may exploit such diversity gain for such modulations. In that case, spatial and temporal whitening may be used to optimize the performance.

Figure 3:
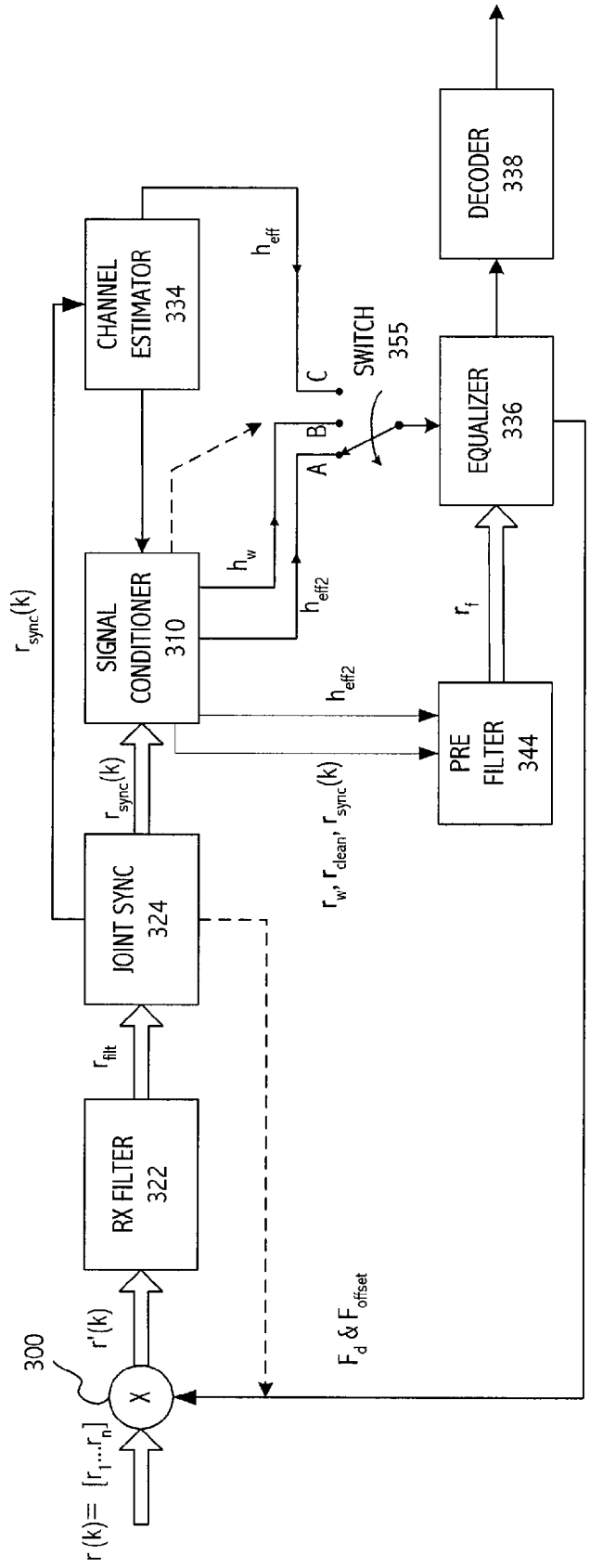
FIG. 3 is a block diagram of the multiple antenna receiver illustrated in FIG. 1 constructed in accordance with the teachings of the present invention.

Referring now to FIG. 3, illustrated is an exemplary embodiment of the multiple antenna receiver 113 according to one embodiment of the present invention. The multiple antenna receiver 113 includes a mixer 300, a receive (RX) filter 322, a synchronization logic module 324, a channel estimator 334, a pre-filter 344, a multi-branch equalizer 336, selection switch 355, a decoder 338 and a signal conditioner 310.

The multiple antenna receiver 113 uses initial channel estimation and revised channel estimation techniques to reproduce and recreate each received signal r1 . . . rn originally transmitted from a transmitting source (i.e., cellular antenna transceiver 101, shown in FIG. 1). (Hereinafter the received signals r1 . . . rn will be referred to as r(k) for ease of explanation.) The method used to calculate the initial and revised channel estimate employs an interference cancellation algorithm that uses feedback from previous calculations of interference factors. Accordingly, as more iterations of the interference cancellation algorithm are made in the multiple antenna receiver 113, the better and more precise each interference calculation becomes. However, as will be appreciated by those skilled in the art, such feedback loops are subject to various receive conditions as the mobile device 103 travels and encounters various physical terrains, which affect the structure of the received signal r(k). A more detailed explanation of the methods used in the multiple antenna receiver 113 is described in the following paragraphs. It should be appreciated that the received signal r(k) is representative of all signals received by the multiple antenna 111, shown in FIG. 1.

Assuming there is negligible feedback in a first frame of each of the received signal r(k) through the multiple antenna receiver 113, the received signal r(k) is passed virtually unmodified to the RX filter 322, in part because of a lack of a good estimate of the Doppler frequency ($F_d$). During this first frame, the output r'(k) of the mixer 300 and the input to the RX filter 322 is virtually identical to the received signal r(k) with the exception of a frequency rotation that offsets the Doppler frequency of the mobile and any frequency offset between the BTS and handset. The offsets $F_d$ and $F_{offset}$ are applied to the received signal r(k) to synchronize the multiple antenna receiver 113 with the transmission bursts from the cellular antenna transceiver 101. The RX filter 322 is preferably a matched filter that matches the transmitter filter and channel condition that passes the desired frequency band of the received signal r(k) and removes any aliases and other spurious signal components from the received signal r(k).

Matching the channel condition is accomplished as each of the received signals r(k) are passed through the RX filter 322 separately, to output independent filtered received signals $r_{filt}$. The filtered received signals ($r_{filt}$) are output from the RX filter 322 and passed to the joint synchronization logic 324. The joint synchronization logic 324 selects the preferred sampling point of each of the filtered received signal ($r_{filt}$) by identifying the position of the training sequence in the filtered received signals $r_{filt}$. Accordingly, based on the determined sampling point of the filtered received signal ($r_{filt}$), the joint synchronization logic 324 may decimate the filtered received signal ($r_{filt}$) to a lower sampling rate. If the subsequent components of the multiple antenna receiver 113 do not require processing at a higher sampling rate, then the sampling rate of the filtered received signal ($r_{filt}$) will be the same as the symbol rate. Because the training sequence of the desired signal d(k) and its relative position within the received signal r(k) are known, it is possible to estimate the channel response of the filtered received signal $r_{filt}$. There are various techniques known in the art that can be used to determine the start of the training sequence. For example, the training sequence and relative positions may be determined by calculating the position of the training sequence code that gives the highest correlation as the synchronized signal $r_t(k)$ is correlated with the desired signal d(k). The desired signal d(k) represents a hypothesized value of the transmitting signal.

It should be appreciated that once each of the positions of the training sequences are identified in each filtered received signal $r_{filt}$, it is necessary to add an offset to one or more of the filtered received signals, such that each of the filtered received signals ($r_{filt}$) can be sampled at the same point using a single sampling rate. In operation, when the joint synchronization logic 324 identifies the position of the training sequence in each of the filtered received signals ($r_{filt}$), the joint synchronization logic 324 selects the preferred sampling offset points among a set of offsets that best maximizes the correlation of the filtered received signal ($r_{filt}$) with the known training sequence, while minimizing the mean square error. This synchronization compensates for the frequency and/or phase shifting caused by limited channel effects, time delays, or multipath fading, i.e., the variable patterns that are caused by reflections of the received signal r(k) from objects such as cliffs and buildings. As such, a noise plus interference factor (C/I+N) is introduced into the received signal r(k).

The joint synchronization logic 324 then outputs the synchronized signals $r_{sync}(k)=[r_{1sync} \ldots r_{nsync}]$ to the channel estimator 334 and the signal conditioner 310. It should be appreciated that it is necessary to produce an initial channel estimate for each of the synchronized signals $r_{sync}(k)$. A preferred embodiment provides a joint channel estimate for all the channels. The initial channel estimate $h_{eff}$ of each synchronized signal $r_{sync}(k)$ is calculated in the channel estimator 334. The initial channel estimates $h_{eff}$ are calculated to compensate for the variation experienced by the signals due to radial distances, terrain, multipath fading, scattering and other channel effects. Out of the channel estimator 334, the initial channel estimate $h_{eff}$ of the synchronized signal $r_{sync}(k)$, is output to the signal conditioner 310.

A wireless multiple antenna receiver typically estimates the interference and compensates for channel distortion adaptively, i.e., the initial channel estimate $h_{eff}$ is revised as each frame of each of the synchronized signals $r_{sync}(k)$ is received by the channel estimator 334. The initial channel estimate $h_{eff}$ characterizes the noise plus interference variance estimator (C/I+N) introduced into the received signal r(k) by the path taken by the received signal r(k), as described above. The C/I+N ratio of the synchronized signal $r_{sync}(k)$ is calculated by the channel estimator 334 and fed, along with the initial channel estimate $h_{eff}$, as inputs into the signal conditioner 310 to provide parameters for calculating control functions used in the signal conditioner 310. Note that in coverage limited applications such as a rural area, the dominant factor is N, so the interference estimator is mostly a C/N ratio. In dense urban areas, I dominates, so it is mostly a C/I ratio.

The initial channel estimate $h_{eff}$ indicates, among other things, each of the received signals r(k), relative to the noise level known as the signal to noise ratio, or C/I, and the level of the multipath fading profile present in the synchronized signals $r_{sync}(k)$. One of ordinary skill in the art will recognize that multipath fading is a form of radio fading caused by the existence of two or more paths between a transceiver and the multiple antenna receiver. Delays on the reflected path may add to (strengthen) or subtract from (fade) the strength of the received signal r(k). It should be appreciated that the levels of acceptable multipath fading may vary and may be geographically dependent. Additionally, multiple antenna receivers typically compensate for the delay and strength profile based on standards in compliance with specific multiple antenna receiver performance parameters.

The signal conditioner 310 uses the input variables (C/I+N) and the initial channel estimate $h_{eff}$ as threshold quantities to apply appropriate filtering to the synchronized signal $r_{sync}(k)$ to produce a revised signal $r_r(k)$. The revised signal $r_r(k)$ is representative of an approximation of the received signal r(k) as a function of the synchronized signal $r_{sync}(k)$. The revised signal $r_r(k)$ is output to the prefilter 344. Depending upon the filtering, if any, applied by the signal conditioner 310, the revised signal is supplied as $r_w$, $r_{clean}$, or $r_{sync}$, as described further herein. The prefilter 344 is preferably a minimum-phase filter. Due to the spread characteristics of the received signal r(k) resultant from C/I+N introduced into the signal, the revised signal $r_r(k)$ is preferably compacted prior to equalization by the multi-branch equalizer 336. The prefilter 344 outputs a filtered $r_f(k)$, signal wherein the energy of the spectral components of the revised signal $r_r(k)$ have been compacted to fall within the symbol rate of the multi-branch equalizer 336, such that the relevant components of the revised signal $r_r(k)$ may be used. This approach may also act to reduce the complexity of the multi-branch equalizer 336.

The prefilter 344 compacts the energy of the received signals $r_{clean}$, or alternatively, the whitened signal $r_w$ or $r_{sync}$, as the case may be, to reduce the number of taps, due to multipath fading, to fewer taps as a preparation step for demodulation. The resulting signal output to the multi-branch equalizer 336 represents a high quality reproduction of the original transmitted signal from the cellular antenna transceiver 101.

The multi-branch equalizer 336 is generally known in the art and may be characterized as a MRC equalizer using MLSE (Maximum Likelihood Sequence Estimation) calculations. It should be appreciated that the multi-branch equalizer 336 may also use IRC (Interference Rejection Combining) methods without departing from the scope of this invention. IRC and MRC use MLSE algorithms (Maximum Likelihood Sequence Estimator) but the metric calculation that defines the most likely sequence (detected data and associated softvalues) is different depending on the particular algorithm utilized (multiple antenna (IRC, MRC), joint detection or blind estimation.

The multi-branch equalizer 336 preferably uses a Viterbi algorithm to manipulate the filtered signal $r_f(k)$ and the channel estimate output from the switch 355. A MLSE calculation is then applied to the signal. The MLSE locally generates all possible representations of the filtered signal $r_f(k)$ based on all of the possible transmitted sequences, and then compares these estimates to the filtered signal $r_f(k)$ that is actually received. As will be appreciated by those skilled in the art, the locally generated signal that most closely matches the received signal indicates what is the most likely transmitted sequence.

The output of the multi-branch equalizer 336 includes softvalues of the filtered signal $r_f(k)$. The MLSE is an optimal detector in the sense of minimizing the accumulated detected errors for the transmitted sequence. The softvalues are fed to the decoder 338 to provide a series of decoded bits/symbols.

Due to the complexity of EDGE, it is preferable that a full Viterbi calculation not be performed in the multi-branch equalizer 336. Rather a more appropriate, albeit sub-optimal algorithm, is preferably employed, such as RSSE (Reduced State Sequence Estimator) or DFSE (Decision Feedback Sequence Estimator) which, generally provides an acceptable trade-off between accuracy and complexity. The softvalues fed to the decoder 338 are generated based on a Viterbi algorithm calculating the states of the filtered signal $r_f(k)$.

Additionally, from the multi-branch equalizer 336, the estimated Doppler and offset frequency ($F_d$ & $F_{offset}$) of the non-dominant interferers are fed back to the mixer 300. The process used to find the estimated Doppler and offset frequencies is common and well known in the art.

The Doppler and offset frequencies represent the apparent change in the received frequency due to the relative motion and rotation of the cellular antenna transceiver 101. Providing and mixing such feedback with the received signal r(k) enhances the second and subsequent calculations of the multiple antenna receiver 113. The frequency offset may also be estimated during the channel estimation phase in channel estimator 334 such that the overall minimum mean square and the channel estimate are jointly minimized. The decoder 338 produces a probability estimation of the softvalues output from the multi-branch equalizer 336 to scale the output softvalues to a more accurate (±1V) line-decoded representation. Finally, the decoder 338 scales the line-decoded representation to a binary representation of the signal to produce the final decoded bits/symbols. These decoded bit/symbols are sent as information data to the handset to be output to the user.

In all subsequent frames of data passed through the multiple antenna receiver 113, the resulting output of the decoder 338 becomes stronger and more accurate due to the iterative nature of the multiple antenna receiver 113 and the feedback loops present.

It should be understood that the multiple antenna receiver 113 of FIG. 3 and FIG. 4 may be, in general, implemented using a variety of hardware and/or software components. For example, the signal separator 428 may use a number of different commonly known communications components, such as demodulators, mixers, filters, and analog-to-digital (A/D) converters. In general, such components may be implemented using hardware such as discrete circuit components, hybrid circuits and application-specific integrated circuits (ASICs), and/or combinations of such hardware and software or firmware configured to execute on special-purpose processing devices or general-purpose processing devices such as microprocessors, microcontrollers and digital signal processor (DSP) chips. The multi-branch equalizer 336 may similarly be implemented using special-purpose hardware such as gate arrays or ASICs, software or firmware executing on special purpose processing devices or on general purpose processing devices such as microprocessors, microcontrollers or DSP chips, or combinations thereof.

As shown in FIG. 4, one embodiment of the signal conditioner 310 preferably contains and/or controls switches 440, 450 and 355, signal separator 428, a controller 430, a spatial and temporal whitening filter (S/T) 432 and a revised channel estimator 435.

In operation, the controller 430 manages the positions of switches 440, 450 and 355. The controller 430 provides control functions to the switches 440, 450 and 355 based on the C/I ratios contained in each of the input channel estimates $h_{\it eff}$ and $h_{\it eff2}$. The possible switch settings and signal treatment based on the C/I ratios are discussed below:

Low C/I Ratio

When low C/I ratios are detected in the synchronized signal $r_{sync}(k)$, a signal separation may be advantageously performed. A low C/I ratio implies a high interference level. Thus, based on threshold parameters of the calculated C/I ratios from the channel estimator 334, the controller 430 will position the switch 450 in the "A" position, and the switch 440 will also be placed in the "A" position. While the switch 440 is in the "A" position, the synchronized signal $r_{sync}(k)$ is passed to the signal separator 428.

With respect to determining the position of switch 440, the controller 430 compares the initial C/I ratio from the initial channel estimator 334 with a whitened C/I ratio from the S/T filter 432. The whitened C/I ratio is a second estimate of the channel response of the cleaned signal $r_{clean}$. Note that with respect to the position of switch 450, if the initial estimate of the C/I ratio is much less than the whitened C/I ratio, then switch 450 should be in the A position since whitening successfully cleaned up the signal. If whitening fails to clean up the signal, that is, if the initial and whitened estimates are approximately equal, then whitening should not be performed as it is ineffectual.

The signal separator 428 performs a separation function using the separation algorithms previously discussed. The separator 428 receives the synchronized signal $r_{sync}(k)$ (which is an array signal) and outputs the separated signal $r_{clean}=[r_{1clean} \ldots r_{nclean}]$ with the C/I+N removed or significantly diminished. The output of the signal separator is an array of "cleaned" separated signals that are supplied to the whitening filter 432 or to the prefilter 344 directly. The separated signal $r_{clean}$ represents a processed clean version of the desired signal d(k), wherein all C/I+N interferers of interest have been removed as determined by the multiple antenna receiver and based on the received signal r(k) and the other parameters set forth above.

From the signal separator 428, all separated interferers $r_{clean}$ are fed to the S/T filter 432 separately, such that a whitened channel estimate $h_w$ of the initial channel estimate $h_{\it eff}$ may be calculated. The whitened channel estimate $h_w$ is supplied to the equalizer 334 and may also be supplied to the prefilter in certain embodiments. As will be appreciated by those skilled in the art, because of the iterative nature of the algorithms running on the multiple antenna receiver, the whitened channel estimate $h_w$, similar to the revised channel estimate, represents a more precise version of the initial channel estimate $h_{\it eff}$. Note that in the low C/I case with multiple interfaces (no dominant interface) the whitening may not provide much gain, so it may be advantageous to separate but not whiten.

Those skilled in the art will recognize that the S/T filter 432 may be implemented by adapting known or conventional filtering of the spatial and temporal whitening component according to teachings herein.

High C/I Ratio

If the interference contribution is considered negligible or non-existent (i.e., high C/I ratio), a signal separation does not need to be performed. In other words, when the values of the C/I ratios are high and exceed a predetermined threshold, the signal separator 428 and the S/T filter 432 are bypassed. In such a case, the switch 440 will be in position B. In this case, signal quality of the synchronized signal $r_{sync}(k)$ is considered good. While the switch 440 is in position B, the synchronized signal $r_{sync}(k)$ is passed unchanged through the switch 440 to the prefilter 344. Accordingly, the switch 450 also is in position "B".

In this high C/I ratio case, a revised channel estimate $h_{\it eff2}$ is calculated. The revised channel estimate $h_{\it eff2}$ is selected with switch 355 in the A position when $r_{sync}$ is separated but not whitened. If the separation is not done, (switch 440 at position B), the channel estimate comes from block 334 with switch 355 in the C position. The synchronized signal $r_{sync}(k)$ is processed in a similar manner to the separated signal $r_{clean}$, as discussed above.

The switch 355 is controlled by controller 430 consistent with the positions of switches 440 and 450. For example, at a low C/I ratio, the switch 355 is set to position "B" to input the whitened channel estimate $h_w$ into the multi-branch equalizer 336. With a high C/I ratio, the switch 355 is set to position A to input the revised channel estimate $h_{\it eff2}$ from revised channel estimate 435. Note that position C is selected for the initial channel estimate. Note that the position C setting is selected for switch 355 when receiving a signal with low interference since interference cancellation is not needed. If the signal is being received from an edge of the cell, the switch 355 needs to be in the A or B position.

An exemplary spatial/temporal (S/T) filter, according to an embodiment of the invention disclosed herein and as discussed above, is shown in FIG. 5. The S/T filter shown in FIG. 5 can be characterized as an adaptive filter. The aim of the adaptive (S/T filter) filter is to iteratively adapt the filter coefficients $W_1$, $W_2$, $W_M$ for each history value of the received signal (or x and y component of the received signal) such that the error sequence of the power of the covariance in the interference and noise is as close to zero as possible, within some value of tolerance. An S/T filter according to an embodiment of the invention, uses previous measurements of each received signal $r_1 \ldots r_i$ symbols to predict the values of the current symbols of the components of the whitened signal $r_w$. Each received signal $r_1 \ldots r_i$ contributes to the whitened signal $r_w$. Thus, the real and imaginary of each received signal $r_1 \ldots r_i$ are crossed-coupled, such that the previous values of the received signals $r_1 \ldots r_i$ impact the value of all of the other received signal components from all of the antennas as shown in FIGS. 5A and 5B.

Figure 5A:
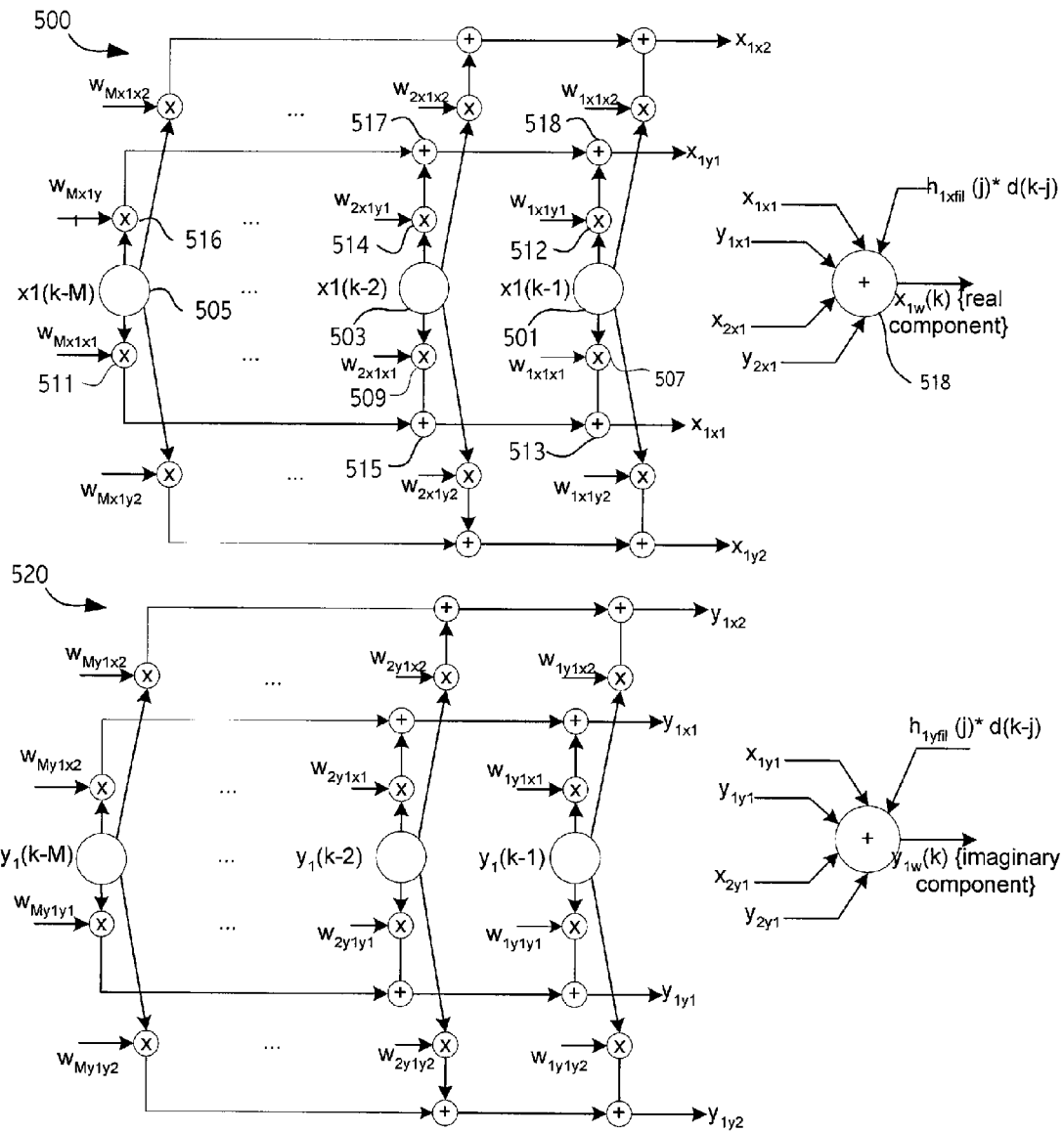
FIG. 5A is a diagram of an embodiment of the signal-whitening filter of the signal conditioner functional component illustrated in FIG. 4.
Figure 5B:
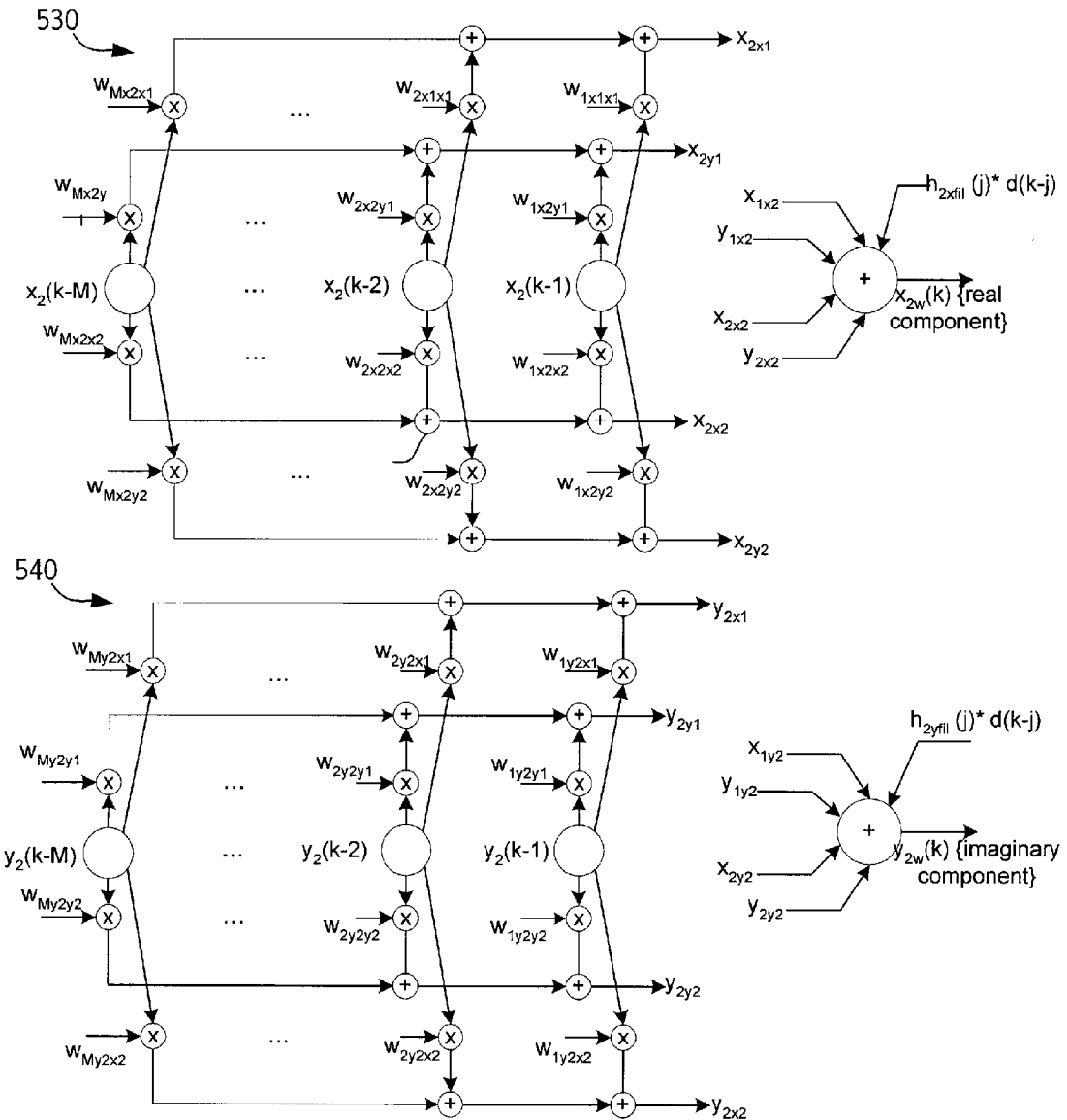
FIG. 5B is a diagram of another embodiment of the signal-whitening filter of the signal conditioner functional component illustrated in FIG. 4.

The exemplary filter shown in FIGS. 5A and 5B is for a two antenna system. The top portion 500 generates the whitened real (x) component of the first antenna ($x_{1w}$). The top portion 500 also generates the contributions for all the other whitened signals. That is, the top portion 500 generates the $x_1$ contribution to the imaginary (y) component signal of the first antenna and the real and imaginary components of the signal received at the second antenna. As described above, each received signal includes colored noise. The goal of the whitening filter is to whiten that noise. Thus, the whitening filter generates a whitened signal for each x and y component, $x1_w$, $y1_w$, $x2_w$ and $y2_w$. For a filter where M=3, 12 separate coefficients (one for each history value of each x and y component) are used to generate the whitened values.

With reference to the two antenna system shown in FIGS. 5A and 5B, in order to form the whitened values at the output of the filter, the contribution from the x component of the signal received at the first antenna is generated by multiplying the symbols x1(k−1), x1(k−2) and x1(k−M), by respective filter coefficients $W_{1x1x1}$, $W_{2x1x1}$, and $W_{Mx1x1}$ in multipliers 507, 509, and 511 and summing the results in summers 513 and 515. The notation $W_{1x1x1}$ represents the filter coefficient for the contribution of the (k−1) x1 symbol to the whitened x1 symbol. The resultant sum $x_{1x1}$ represents the contribution from the channel history of the x component of the signal at the first antenna to the whitened $x_1$ component generated by the whitening filter. That value $x_{1x1}$ is supplied to summer 518, which also receives the contributions from the y component of the signal received at the first antenna $y_{1x1}$, the contribution from the x component of the signal received at the second antenna $x_{2x1}$, and the contribution from the y component of the signal received at second antenna $y_{2x1}$. The resulting values are summed in summer 518 along with $h_{1xfil}$(j)*d(k−j), which was defined previously, to generate the whitened value $x_{1w}(k)$.

The three $x_1$ symbols $x_1(k-1)$, $x_1(k-2)$, $x_1(k-3)$ are also multiplied by respective coefficients ($W_{1x1y1}$, $W_{2x1y1}$, and $W_{Mx1y1}$) in multipliers 512, 514, and 516. The results of the multiplications are summed in summers 517 and 518 to generate the $x_1$ contribution ($x_{1y1}$) to the whitened output $y_{1w}$. The coefficient notation $W_{1x1y1}$ describes the coefficient for the $x_1(k-1)$ symbol used to determine the $x_1$ contribution (that is, the contribution by the x component of the signal received at the first antenna) to $y_1$. The filter portion 500 generates similar contributions $x_{1x2}$ for the $x_2$ portion of the filter 530 (shown in FIG. 5B) and $x_{1y2}$ for the $y_2$ portion of the filter 540 (shown in FIG. 5B).

FIG. 5A also illustrates the generation of the contributions from the $y_1$ portion of the filter 520. Similar to the $x_1$ portion 500, the $y_2$ portion multiplies each symbol $y_1(k-1)$, $y_1(k-2)$, $y_1(k-M)$ by 12 different coefficients (assuming M=3). As shown in FIG. 5B, the $x_2$ portion 530 and $y_2$ portion 540 of the filter are constructed identically with appropriate coefficients being used to multiply each symbol $x_2(k-1)$, $x_2(k-2)$, $x_2(k-M)$ by 12 different coefficients and each symbol $y_2(k-1)$, $y_2(k-2)$, $y_2(k-M)$. The $y_2$ contribution is supplied to summer 518 as $y_{2x1}$, signifying the $y_2$ contribution to $x_1$. Similarly, the $x_2$ contribution is supplied to summer 518 as $x_{2x1}$, signifying the $X_2$ contribution to $x_1$.

In design, the S/T filter must have an order (M) that is large enough to accurately predict the correlation between adjacent real and imaginary symbols. As the order (M) of the filter is successively increased, the correlation between each received signal $r_1 \ldots r_i$ is reduced until the S/T filter produces a sequence of uncorrelated whitened signals $r_w$. Accordingly, the whitening of the input signal is accomplished to produce the whitened signal $r_w$. Note that the filter shown in FIGS. 5A and 5B is relatively complex in a multiple antenna system, particularly as the number of antennas rises above 2. For example, the filter for the two antenna system shown in FIG. 5 includes 48 multiplications (12 for each x and y component). If the system were three antennas, the number of multiplications would rise to 108.

Figure 6A:
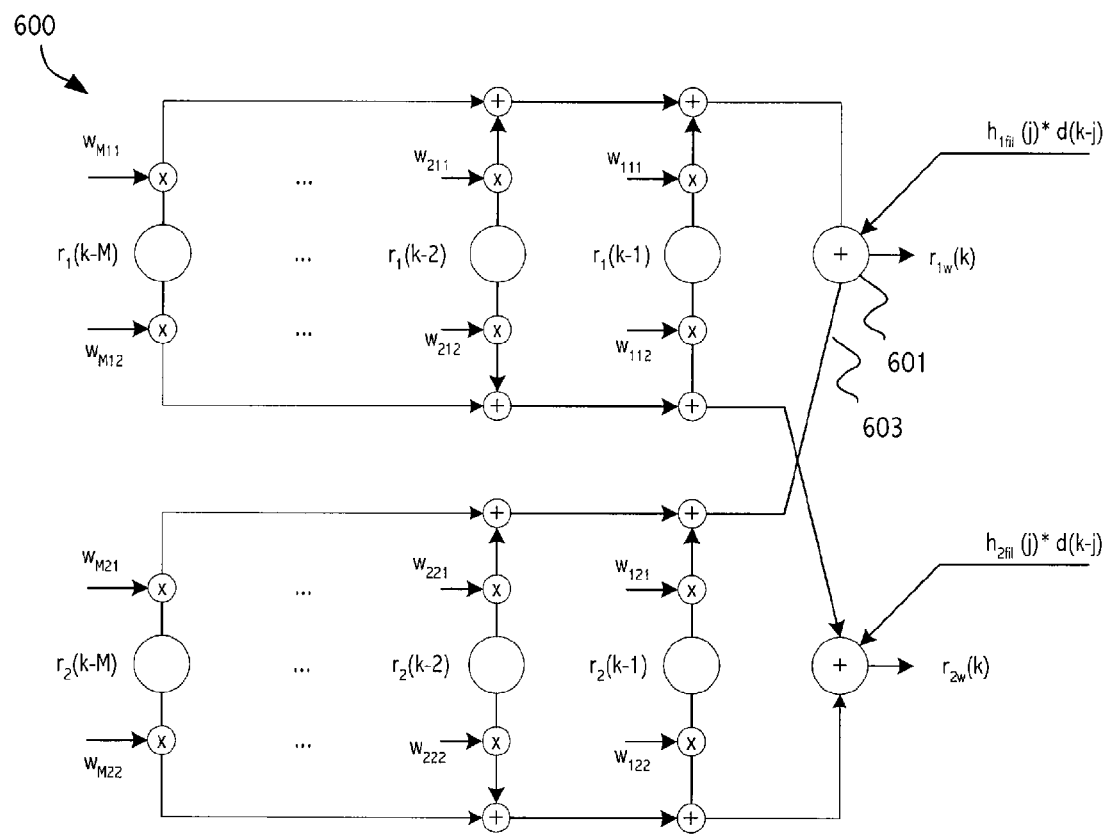
FIG. 6A illustrates an embodiment of a sub-optimum signal-whitening filter of the signal conditioner functional component illustrated in FIG. 4.

Instead of using the filter shown in FIGS. 5A and 5B, a less complex sub-optimum filter such as the one shown in FIG. 6A may be utilized. While the suboptimum filter may not provide as good performance as the filter shown in FIGS. 5A and 5B, for some embodiments, the tradeoff of reduced complexity for somewhat reduced performance may be acceptable. Rather than filter the individual x and y components, the whitening filter may be applied to the $r_i$ signal as a whole as shown in FIG. 6A. FIG. 6A illustrates the sub-optimum filter for a two antenna case. The reduced complexity is evident in comparing the whitening filter for the two antenna system shown in FIGS. 5A and 5B with the whitening filter shown for the two antenna system shown in FIG. 6A.

For the two antenna case, the suboptimal case, the filtered signals $r_{1w}$ and $r_{2w}$ are defined as:

$$r_{1w} = r_1 w_{11} + r_2 w_{21}$$
$$r_{2w} = r_2 w_{22} + r_1 w_{12}, \text{ or}$$

$$\begin{bmatrix} r_{1w} \\ r_{2w} \end{bmatrix} = \begin{bmatrix} w_{11} & w_{21} \\ w_{12} & w_{22} \end{bmatrix} \begin{bmatrix} r_1(k-1) \\ r_1(k-2) \\ \vdots \\ r_1(k-M) \\ r_2(k-1) \\ r_2(k-2) \\ \vdots \\ r_2(k-M) \end{bmatrix}$$

where, $w_{11}=[w_{111}, w_{211}, \ldots, w_{M11}]$ and where $w_{M11}$ is the coefficient multiplying the (k−M) $r_1$ symbol providing the contribution to $r_1$; where $w_{21}=[w_{121}, w_{221}, \ldots, w_{M21}]$, and where $w_{M21}$ is the coefficient multiplying the (k−M) $r_2$ symbol providing a contribution to $r_1$; where, $w_{12}=[w_{112}, w_{212}, \ldots w_{M12}]$, and where $w_{M12}$ is the coefficient multiplying the (k−M) $r_1$ symbol providing the contribution to $r_2$, where $w_{22}=[w_{122}, w_{222}, \ldots, w_{M22}]$, and where $w_{M22}$ is the coefficient multiplying the (k−M) $r_2$ symbol providing a contribution to $r_2$.

Figure 6B:
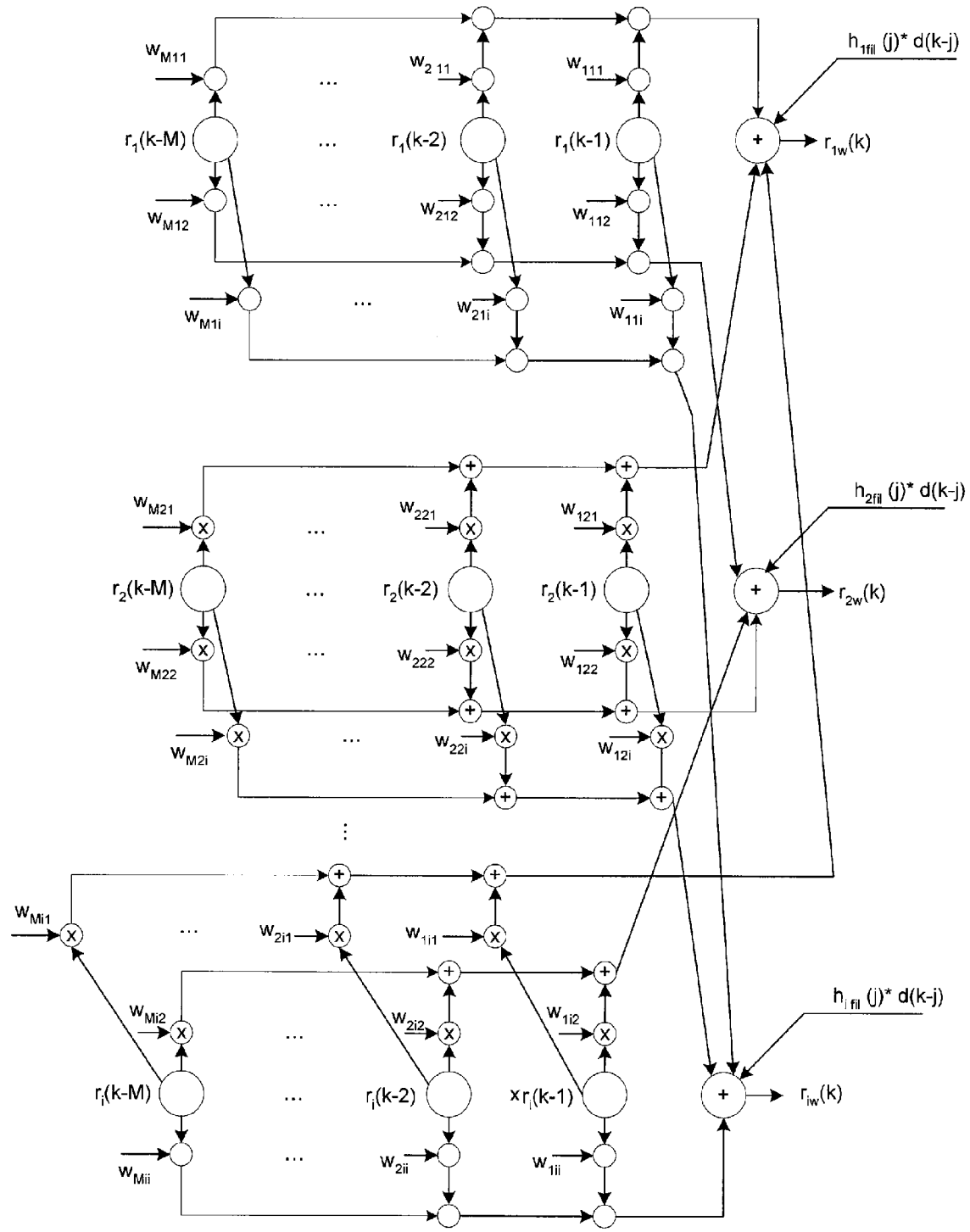
FIG. 6B illustrates an embodiment of a sub-optimum signal-whitening filter of the signal conditioner functional component illustrated in FIG. 4.

Referring to FIG. 6A, the exemplary suboptimal implementation assumes a channel length of M symbols. The coefficient $W_{M11}$ represents the coefficient for contribution from Mth symbol $r_1(k-M)$ to the whitened symbol $r_{w1}$. The coefficients identify the symbol it is related to and the contribution for which it is intended. For example, the coefficient $W_{M12}$ represents the coefficient for determining the contribution from Mth symbol $r_1(k-M)$ to the whitened symbol $r_{w2}$. FIG. 6B illustrates an exemplary embodiment of the general case for the sub-optimum filter.

Figure 7:
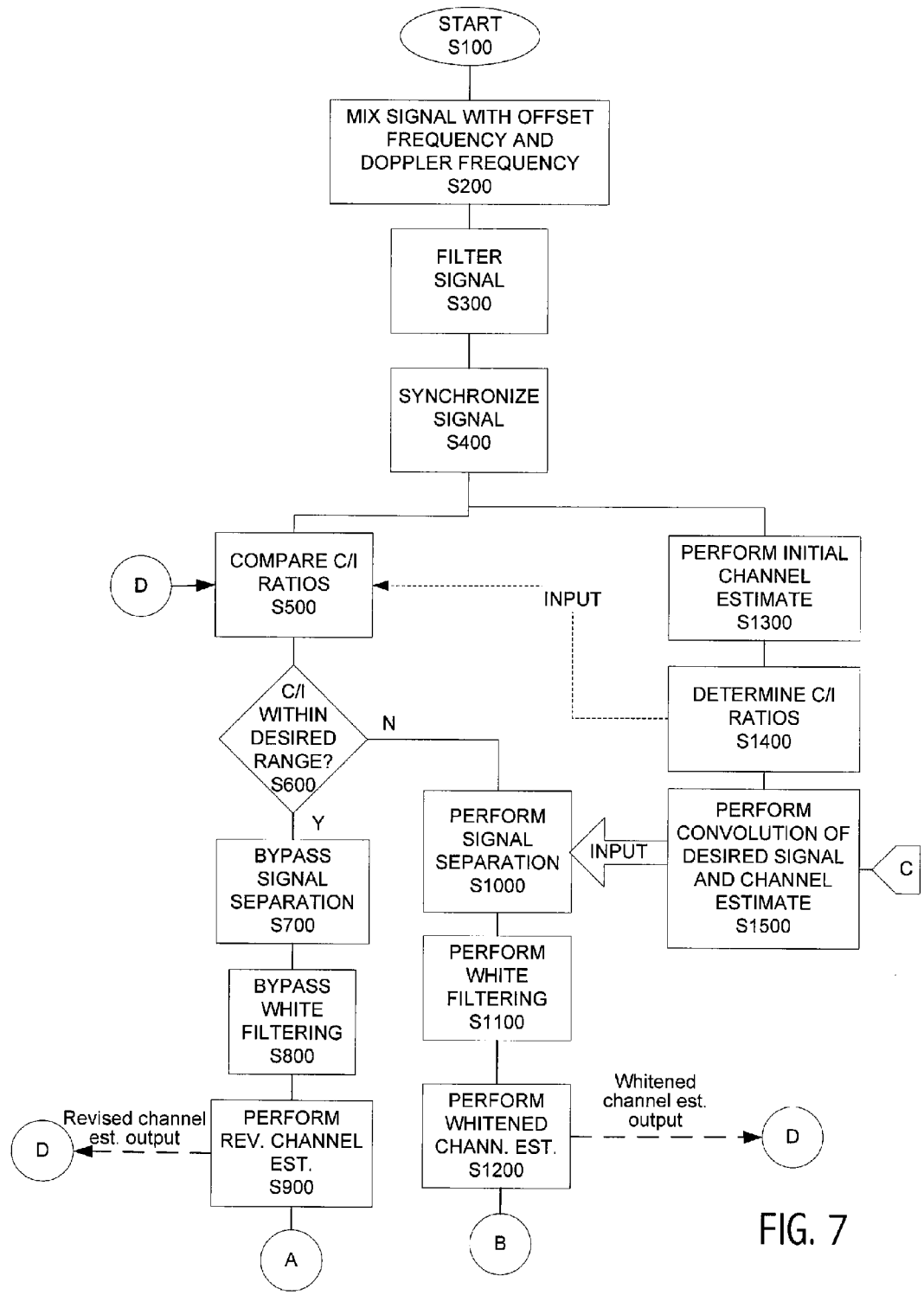
FIG. 7 is a flow diagram illustrating operationally the multiple antenna receiver in a preferred multiple antenna environment.
Figure 8:
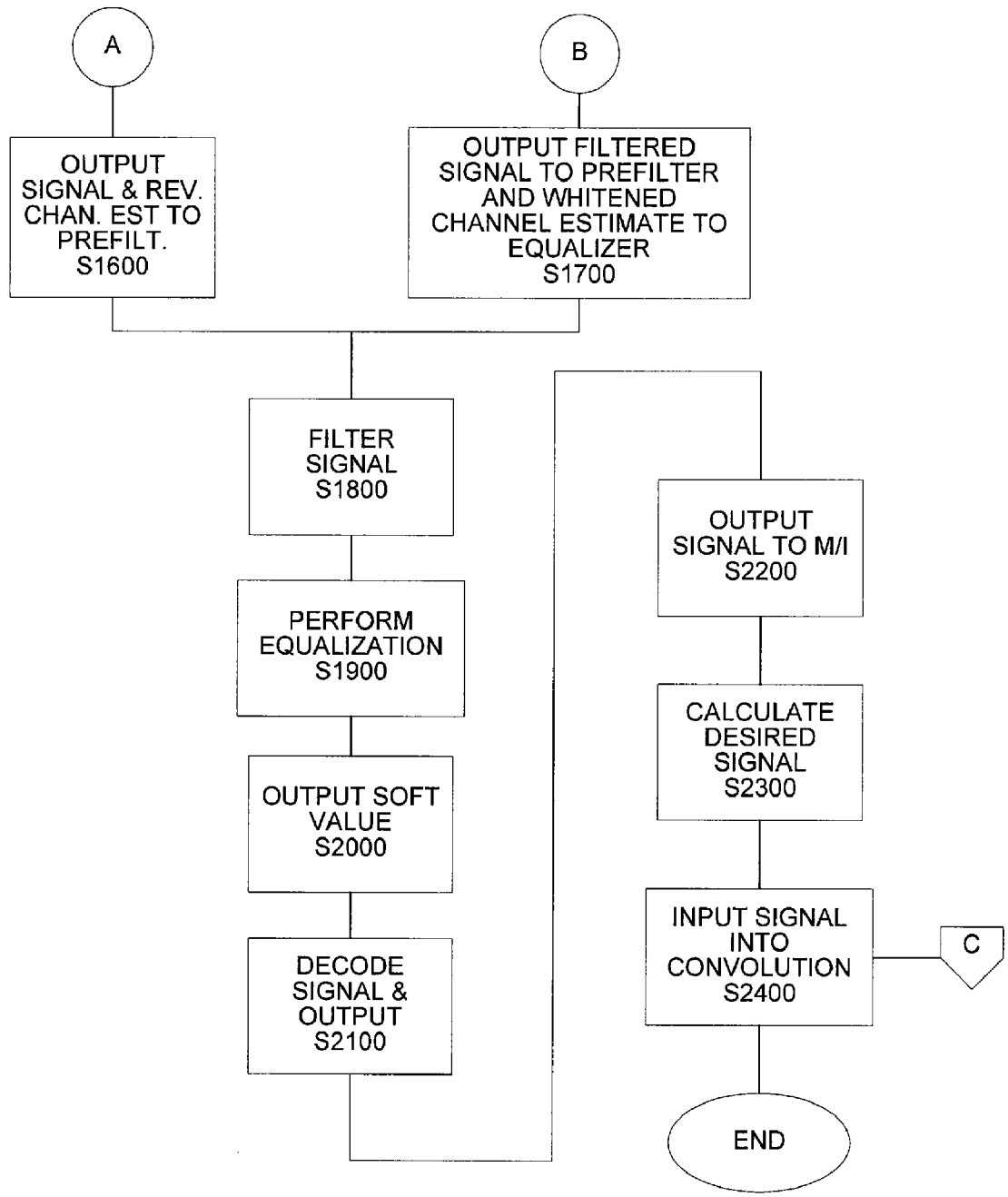
FIG. 8 is a flow diagram illustrating the post-processing functionality of the receiver in a preferred multiple antenna receiver environment.

FIGS. 7 and 8 illustrate an exemplary method for interference canceling, according to an embodiment of the invention. The method begins at step S100 and proceeds to step S200 wherein a transmitted signal is received from a cellular antenna transceiver and mixed with a previously measured Doppler and Offset frequency. The Doppler and Offset frequencies represent the apparent change in the received frequency due to the relative motion of the cellular antenna transceiver. The process then continues to step S300.

At step S300, the received signal is filtered using a matching filter to correct the appropriate frequency band of the received signal. The filter also removes any unnecessary signal components from the received signal due to co-channel interference, bleeding, phase shifts, wideband interference, etc. Upon completion of the filtering, the filter outputs a filtered received signal to a synchronizer. The process then continues to step S400.

At step S400, the synchronizer determines the training sequence of an interferer and its relative position within the filtered received signal. The training sequence and its relative position are determined by the position that gives the highest correlation as the corrected signal is compared to a desired signal. Once the position of the training sequence is known, the synchronizer applies the appropriate offset frequencies to the signal to produce a synchronized signal. The process then proceeds to steps S500 and S1300 simultaneously.

At step S1300, an initial channel estimate is performed on the synchronized signal. The process then proceeds to step S1400, where the C/I ratio of the initial channel estimate is calculated. Once the C/I ratio is calculated, it is input into a controller (S500). The process then continues to step S1500.

At step S1500, a convolution of the desired signal and the initial channel estimate is calculated. The convolved signal is input into a signal separator for use in producing a separated signal in step S1000.

In step S500, the C/I ratios from the initial channel estimate, the whitened channel estimate and the revised channel response are compared, as necessary, to determine whether they are within a predetermined range or a predetermined threshold at step S600. For example, in one embodiment, if the C/I ratio is >15 dB, the whitening filter is bypassed. If the ratios are above the predetermined threshold, the process continues to step S700. Otherwise, if the C/I ratio is sufficiently low, the process jumps to step S1000. In an embodiment, the signal separator 428 measures SNR (signal to noise ratio) to determine whether a whitening filter is further needed. It is desirable that signal separation and whitening implementation complexity be low.

At steps S700 and S800, the signal separation and white filtering processes are bypassed in favor of conventional separation methods. The process then continues to step S900.

At step S900, a revised channel estimate is calculated. The revised channel estimate is fed back to the controller for comparison with the initial channel estimate or the whitened channel estimate, as necessary. The process continues to step S1600, as illustrated in FIG. 8.

At step S1600 the signal, whether it is a separated signal or the synchronized signal (due to the position of switch 450) and the revised channel estimate are passed to the prefilter at step S1800.

If the C/I ratio indicates it, at step S1000, a signal separation is performed based on the input from the convolution of the desired signal and the initial channel response (S1500). The process then continues to step S1100.

At step S1100, white and spatial filtering is performed on the separated signal to output a whitened signal. At step S1200, a whitened channel estimate is determined for the whitened signal. The process then continues to step S1700.

At step S1700, the whitened signal is output to a prefilter and the whitened channel estimate is output to the equalizer at step S1800.

At step S1800, the prefilter compacts the whitened or revised signal, as the case may be (for example, depending on the position of switch 450 of FIG. 4), to remove the effects of the spread characteristics resultant from C/I introduced into the signal. The process then continues to step S1900.

At step S1900, an MLSE step is performed using Viterbi calculations and a branch metric is performed to trace back the original states of the received signal. From this trace back step, at step S2000, softvalues are output to a decoder.

Additionally, at step S1900 the estimated Doppler and Offset frequencies of the non-dominant interferers are fed back to a mixer to be used in step S200. The process then continues to step S2100.

At step S2100 the softvalues are decoded to produce the detected bits/symbols. The process then continues to step S2200, where the detected bits/symbols are output to a modulator and interleaver. The process then continues to steps S2300 and S2400, wherein the desired signal is calculated from the detected bits/symbols and is output to a convolution function (step S1500) where a convolution of the desired signal and the initial channel estimate is performed.

The process finally ends at step S2500.

Although the process outlined in FIGS. 7 and 8 are described with a specific order of operation, one of ordinary skill will recognize that the order of many of the processes can be rearranged without departing from the scope of the invention. For example, with respect to FIG. 7, the process automatically bypasses the white and spatial filtering of the synchronized signal as a result of the separation step being bypassed. However, is should be recognized that the white and spatial filtering may be performed should the synchronized signal contain spatial or white noise.

The invention as embodied herein has been applied to the voice channel as an example. Those skilled in the art will recognize that the techniques and processes of the present invention may be used in other parts of a cellular system and applied to other types of wireless devices. For example, other modes of operation may include: 1) manipulating the interference cancellation for all logical channels traffic channels (TCH) and associate control channels (ACCH) of a wireless network; 2) employing the embodiments disclosed herein (interference cancellation) for the ACCH channel and not the traffic channel. (This is typically the case when operating in robust lower codec mode (4.75 and 5.9 codec) and the signaling is not as robust.); and 3) employ the embodiments disclosed herein (interference cancellation) for TCH and not ACCH. (This is typically the case when operating in less robust mode such as 12.2 and the signaling is relatively robust.)

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:
1. A method comprising:
receiving a plurality of signals in respective antennas of a multiple antenna receiver;
processing the received signals to generate respective processed signals, each of the received signals including a colored noise component;
applying a whitening filter to the respective processed received signals to generate whitened signals, the whitened signals having the colored noise component whitened, the whitening filter determining the whitened sig- nals, at least in part, utilizing symbols corresponding to the signals received by the plurality of antennas; and selectively performing signal separation prior to the whitening filter according to a determined (C/I) ratio.

2. A method comprising:

receiving a plurality of signals in respective antennas of a multiple antenna receiver;

processing the received signals to generate respective processed signals, each of the received signals including a colored noise component;

applying a whitening filter to the respective processed received signals to generate whitened signals, the whitened signals having the colored noise component whitened, the whitening filter determining the whitened signals, at least in part, utilizing symbols corresponding to the signals received by the plurality of antennas, wherein the whitening filter has an order M, indicative of the number of symbols associated with previous measurements of each of the received signals that are utilized to generate the whitened signals, M being at least 3; and utilizing for generation of each whitened signal, with an N antenna system and the whitening filter with the order M, N×M symbols multiplied by N×M coefficients, each multiplication result corresponding to the colored noise contribution of one of the symbols.

3. A method comprising:

receiving a plurality of signals in respective antennas of a multiple antenna receiver;

processing the received signals to generate respective processed signals, each of the received signals including a colored noise component;

applying a whitening filter to the respective processed received signals to generate whitened signals, the whitened signals having the colored noise component whitened, the whitening filter determining the whitened signals, at least in part, utilizin~ symbols correspondin~ to the signals received by the plurality of antennas, wherein the whitening filter has an order M, indicative of the number of symbols associated with previous measurements of each of the received signals that are utilized to generate the whitened signals, M being at least 3;

utilizing separate real (x) and imaginary (y) components of each of the received signals to generate each of the whitened signals; and for generation of each whitened signal, with an N antenna system and the whitening filter with the order M, utilizing N×M×2 symbols multiplied by N×M×2 coefficients, each multiplication result corresponding to the colored noise contribution of one of the symbols.

4. The method as recited in claim 1 wherein the whitening filter is a multistage adaptive predictive filter forming each whitened signal using coefficients for each of a plurality of symbols corresponding to signals received by the antennas.

5. The method as recited in claim 1 further comprising forming a whitened channel estimate associated with the whitened signals.

6. The method as recited in claim 5 further comprising supplying the whitened channel estimate to an equalizer.

7. A multiple antenna receiver comprising:

a whitening filter coupled to receive processed signals corresponding to signals received at respective antennas, and to generate whitened signals corresponding to each of the received signals, the whitened signals having a colored noise component whitened, the whitening filter coupled to determine the whitened signals, at least in part, utilizing symbols corresponding to the signals received by the plurality of antennas;

wherein the whitening filter has an order M, indicative of the number of symbols associated with previous determinations of each of the received signals utilized to generate the whitened signals, M being at least 3; and wherein the multiple antenna is coupled to receive signals from N antennas, N being greater than or equal to 2, the multiple antenna receiver comprising N×M multipliers coupled to multiply N×M symbols with N×M coefficients, each multiplication result corresponding to the colored noise contribution of one of the symbols.

8. A multiple antenna receiver comprising:

a whitening filter coupled to receive processed signals corresponding to signals received at respective antennas, and to generate whitened signals corresponding to each of the received signals, the whitened signals having a colored noise component whitened, the whitening filter coupled to determine the whitened signals, at least in part, utilizing symbols corresponding to the signals received by the plurality of antennas;

wherein the whitening filter has an order M, indicative of the number of symbols associated with previous determinations of each of the received signals utilized to generate the whitened signals, M being at least 3;

wherein the whitening filter is coupled to utilize separate real (x) and imaginary (y) components of each of the received signals to generate each of the whitened signals; and wherein the multiple antenna receiver is coupled to receive signals from N antennas, N being greater than or equal to 2, the multiple antenna receiver comprising N×M×2 multipliers coupled to multiply N×M×2 symbols with N×M×2 coefficients, each multiplication result corresponding to the colored noise contribution of one of the symbols.

9. A multiple antenna receiver comprising:

a whitening filter coupled to receive processed signals corresponding to signals received at respective antennas, and to generate whitened signals corresponding to each of the received signals, the whitened signals having a colored noise component whitened, the whitening filter coupled to determine the whitened signals, at least in part, utilizing symbols corresponding to the signals received by the plurality of antennas, wherein the whitening filter has an order M, indicative of the number of symbols associated with previous determinations of each of the received signals utilized to generate the whitened signals, M being at least 3; and a signal separator coupled to selectively supply the whitening filter with the processed signals having noise components separated according to a determined C/I ratio.

10. The multiple antenna receiver as recited in claim 7 wherein the whitening filter is a spatial and temporal whitening filter coupled to generate a whitened channel estimate associated with the whitened signals.

11. The multiple antennas receiver as recited in claim 10 further comprising an equalizer coupled to selectively receive the whitened channel estimate.

12. A method comprising:

receiving signals at a multiple antenna receiver and generating a synchronized signal therefrom;

generating an initial carrier to interference (C/I) estimate associated with the synchronized signal;

if the initial C/I estimate is below a threshold C/I ratio, supplying the synchronized signal to a signal separator to separate the synchronized signal to generate a cleaned synchronized signal;

generating a second C/I estimate of the cleaned synchronized signal;

comparing the initial C/I estimate with the second C/I estimate;

if comparison indicates that the initial C/I estimate is less than the second C/I estimate, supplying the cleaned synchronized signal to a whitening filter for whitening the cleaned synchronized signal; and if the comparison indicates that the initial C/I estimate is approximately equal to the second C/I estimate, bypassing the whitening filter.

13. The method as recited in claim 12 further comprising:

if the initial C/I estimate is above the threshold C/I ratio, bypassing the signal separator and the whitening filter; and supplying the synchronized signal to a prefilter.

* * * * *

UNITED STATES PATENT AND TRADEMARK OFFICE
CERTIFICATE OF CORRECTION

PATENT NO.         : 8,031,794 B2
APPLICATION NO.    : 11/561134
DATED              : October 4, 2011
INVENTOR(S)        : Ayman Mostafa It is certified that error appears in the above-identified patent and that said Letters Patent is hereby corrected as shown below:

Col. 11, line 17, after the first line of formula (16), add --where-- before the second line of the formula (16)
Col. 12, line 1, please delete "where"
Col. 25, line 36, please replace "utilizin~" with --utilizing--
Col. 25, line 36, please replace "correspondin~" with --corresponding--

Signed and Sealed this
Twenty-ninth Day of November, 2011

David J. Kappos
*Director of the United States Patent and Trademark Office*